(12) United States Patent
Wilson, Jr.

(10) Patent No.: US 7,610,366 B2
(45) Date of Patent: Oct. 27, 2009

(54) DYNAMIC NETWORK DEVICE RECONFIGURATION

(75) Inventor: Richard A Wilson, Jr., Fallbrook, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 596 days.

(21) Appl. No.: 09/985,709

(22) Filed: Nov. 6, 2001

(65) Prior Publication Data

US 2003/0088651 A1     May 8, 2003

(51) Int. Cl.
G06F 15/173    (2006.01)
G06F 15/177    (2006.01)

(52) U.S. Cl. ..................... 709/223; 709/220

(58) Field of Classification Search ........... 709/221, 709/223–224, 220, 226, 203, 206, 229
See application file for complete search history.

(56) References Cited

U.S. PATENT DOCUMENTS

| | | | | |
|---|---|---|---|---|
| 3,843,953 | A | 10/1974 | Maley et al. ............. 340/172.5 |
| 5,142,667 | A | 8/1992 | Dimperio et al. ............ 395/115 |
| 5,402,528 | A | 3/1995 | Christopher et al. ........ 395/109 |
| 5,497,490 | A | 3/1996 | Harada et al. ................ 395/700 |
| 5,530,862 | A | 6/1996 | Wadsworth et al. ......... 395/700 |
| 5,621,892 | A * | 4/1997 | Cook ......................... 709/224 |
| 5,696,701 | A * | 12/1997 | Burgess et al. ................ 714/25 |
| 5,740,431 | A | 4/1998 | Rail ............................ 395/616 |
| 5,781,710 | A | 7/1998 | Fromherz et al. ........... 395/114 |
| 5,784,702 | A * | 7/1998 | Greenstein et al. .......... 711/173 |
| 5,787,288 | A | 7/1998 | Nagata et al. ................ 395/712 |
| 5,877,966 | A | 3/1999 | Morris et al. ................ 364/512 |
| 5,889,953 | A * | 3/1999 | Thebaut et al. ............. 709/221 |
| 5,951,680 | A | 9/1999 | Redlin et al. .................... 713/1 |
| 6,112,256 | A | 8/2000 | Goffinet et al. ................ 710/8 |
| 6,119,156 | A * | 9/2000 | Filion et al. ................. 709/220 |

(Continued)

FOREIGN PATENT DOCUMENTS

DE        3919782        2/1990

(Continued)

OTHER PUBLICATIONS

Merriam-Webster Online dictionary, definition of apparatus available at: http://www.merriam-webster.com/dictionary/apparatus.*

(Continued)

*Primary Examiner*—Hassan Phillips
*Assistant Examiner*—Kamal B Divecha
(74) *Attorney, Agent, or Firm*—Fitzpatrick, Cella, Harper & Scinto

(57) ABSTRACT

Managing a plurality of multifunction network devices on a network, each multifunction network device having a plurality of hardware resources including a storage memory for storing a plurality of function modules, a program memory for use by the function modules and a processor for executing each of the function modules, including detecting a reconfiguration event for one of the plurality of multifunction network devices, sending a reconfiguration command to the one multifunction network device, the reconfiguration command being a deletion command to delete at least one of the function modules or an allocation command to reallocate an amount of at least one of the hardware resources available for use by each of the plurality of function modules, and receiving confirmation that the one multifunction network device has been reconfigured in accordance with the reconfiguration command.

49 Claims, 15 Drawing Sheets

U.S. PATENT DOCUMENTS

| | | | |
|---|---|---|---|
| 6,125,390 A * | 9/2000 | Touboul | 709/223 |
| 6,147,767 A | 11/2000 | Petteruti et al. | 358/1.18 |
| 6,167,567 A * | 12/2000 | Chiles et al. | 717/173 |
| 6,269,401 B1 * | 7/2001 | Fletcher et al. | 709/224 |
| 6,404,743 B1 * | 6/2002 | Meandzija | 370/254 |
| 6,480,901 B1 * | 11/2002 | Weber et al. | 709/246 |
| 6,546,484 B2 * | 4/2003 | Hirai | 713/2 |
| 6,550,017 B1 * | 4/2003 | Moiin et al. | 714/4 |
| 6,724,495 B1 | 4/2004 | Morisaki | 358/1.15 |
| 6,754,664 B1 * | 6/2004 | Bush | 707/102 |
| 6,839,717 B1 * | 1/2005 | Motoyama et al. | 707/104.1 |
| 6,859,843 B1 * | 2/2005 | Sanchez | 709/250 |
| 7,038,798 B2 * | 5/2006 | Kobayashi | 358/1.15 |
| 2001/0025312 A1 * | 9/2001 | Obata | 709/226 |
| 2002/0196451 A1 * | 12/2002 | Schlonski et al. | 358/1.1 |
| 2003/0028624 A1 * | 2/2003 | Hasan et al. | 709/220 |
| 2003/0033395 A1 * | 2/2003 | Sato | 709/223 |
| 2003/0037098 A1 * | 2/2003 | Niwa et al. | 709/203 |
| 2003/0051011 A1 * | 3/2003 | Schacht et al. | 709/221 |
| 2003/0074428 A1 * | 4/2003 | Haines | 709/220 |
| 2003/0191829 A1 * | 10/2003 | Masters et al. | 709/223 |

FOREIGN PATENT DOCUMENTS

| | | |
|---|---|---|
| EP | 478346 | 4/1992 |
| JP | 11-259257 | 9/1999 |
| WO | 99/49383 | 9/1999 |

OTHER PUBLICATIONS http://wiki.answers.com/Q/What_is_the_difference_between_distributed_systems_and_systems_connected_in_a_network.* http://wiki.answers.com/Q/What_is_the_difference_between_a_computer_network_and_a_distributed_system.*

"Java™ Development for Embedded Systems Component Distribution System—Visual Age® Micro Edition", International Business Machines Corporation, Rev. Mar. 28, 2001, (6 pages).

C. Bettstetter, et al., "A Comparison of Service Discovery Protocols and Implementation of the Service Location Protocol", EUNICE—Open European Summer School, Xx, XX, Sep. 2000, XP002279616, pp. 1-8.

* cited by examiner

| DEVICE ID (120) | DEVICE MANUFACT. (121) | DEVICE MODEL (122) | PRINTER FUNCT. MOD. (123) | SCANNER FUNCT. MOD. (124) | FACSIMILE FUNCT. MOD. (125) | OTHER FUNCT. MOD. (126) |
|---|---|---|---|---|---|---|
| 00000001 | SMITH, INC. | xxx-2 | v3 | v1 | v4 | n/a |
| 00000002 | SMITH, INC. | yyy-0 | v2 | v3 | n/a | v2 |
| 00000003 | JONES, INC. | xyz-1 | v1 | v1 | v1 | n/a |
| 00000004 | JONES, INC. | zzz-5 | v4 | v2 | v4 | v1 |
| 00000005 | SMITH, INC. | xyx-3 | v3 | v3 | n/a | n/a |
| 00000006 | ZEBRA, INC. | zxz-4 | v5 | v5 | v5 | n/a |

FIG. 8

| DEPT.(s) ⌐130 | DEVICE ID.(s) ⌐131 | SCHEDULE RATE ⌐132 | START TIME ⌐133 | STOP TIME ⌐134 | SCHEDULED FUNCTION ⌐135 |
|---|---|---|---|---|---|
| ACCOUNTING | ALL | DAILY | 5:00 p.m. | 10:00 p.m. | PRINT ONLY |
| LEGAL | ALL | DAILY | 7:00 p.m. | 12:00 a.m. | FAX ONLY |
| ADVERTISING | 00000002; 00000004 | WEEKLY | TUESDAY, 2:00 p.m. | TUESDAY, 5:00 p.m. | SCAN ONLY |
| BILLING | ALL | MONTHLY | 15th, 6:00 p.m. | 16th, 3:00 p.m. | PRINT ONLY |
| ENGINEERING | 00000005; 00000007 | ONCE ONLY | 07/08/01, 4:00 a.m. | 07/08/01, 10:00 a.m. | FAX ONLY |
| ENGINEERING | ALL | WEEKLY | THURSDAY, 8:00 p.m. | FRIDAY, 4:00 a.m. | PRINT ONLY |
| LEGAL | 00000001 | DAILY | 3:00 p.m. | 5:00 p.m. | PRINT ONLY |
| ALL | ALL | MONTHLY | 25th, 11:00 p.m. | 26th, 4:00 a.m. | DOWNLOAD UPDATE |
| . | . | . | . | . | . |
| . | . | . | . | . | . |
| . | . | . | . | . | . |
| . | . | . | . | . | . |

FIG. 9

DYNAMIC NETWORK DEVICE RECONFIGURATION

BACKGROUND OF THE INVENTION

1. Field of the Invention

The invention concerns the dynamic reconfiguration of a network device based on demand for certain functional capabilities of the network device. In particular, the network device is a multifunction device, such as a combination fax/scanner/printer, which can be dynamically reconfigured by a configurator module on the network to have the capability to perform a different combination of functions. Of course the multifunction device can be any type of network client that needs to dynamically load and/or unload functionality for performance reasons, or for portability reasons related to low-hardware capacity equipped network devices. For example, the configurator module can reconfigure the network device to only be capable of performing a single function or a subset of the original functions. The configurator module can also reconfigure the network device to be capable of performing a new function in addition to the original functions. The configurator module utilizes a component repository to download appropriate functional components to the network device when necessary for reconfiguration.

2. Description of the Related Art

The use of a multifunction network device in a network environment allows network users to access a multitude of functional capabilities at a particular location. For example, a multifunction network device can comprise a combination fax/scanner/printer so that a user near the device can conveniently utilize the fax, scan and print capabilities of the device. In this manner, the use of such a multifunction network device reduces the need for separate single-function network devices which can only perform one function each.

Accordingly, a network fax device, a network scanner and a network printer can be replaced with a single multifunction network device. The use of the multifunction network device therefore has the benefit of reducing physical space that would otherwise be necessary to place multiple single-function network devices capable of the same functionality. In addition, the use of a multifunction network device is easier for a system administrator to manage because it reduces the overall number of network devices that would otherwise have to be managed.

Although multifunction network devices have several advantages as discussed above, they may experience reduced performance in comparison with single-function network devices. This reduced performance can be the result of limited hardware capacities of the multifunction network device, such as random access memory (RAM) and hard disk drive (HDD) capacities, as well as processor (CPU) capacity. A single-function network device, such as a network printer, has the dedicated support of the RAM, HDD and CPU within the device for performing a single function, such as printing. On the other hand, the RAM, HDD and CPU within a multifunction network device must support multiple functions, such as faxing, scanning and printing.

The capacities of the RAM, HDD and CPU within a multifunction network device are not necessarily proportional in relation to the multiple functions supported by the device. Accordingly, the multifunction network device may have less free capacity of the RAM, HDD and CPU to utilize when performing a particular function than a single-function network device has when performing the same function. For example, a typical multifunction network fax/scanner/printer might have ten megabytes (MB) of RAM and a one gigabyte (GB) HDD. The code associated with the fax function utilizes two MB of the RAM and two-hundred MB of the HDD, the code associated with the scan function utilizes three MB of the RAM and five-hundred MB of the HDD, and the code associated with the print function utilizes three MB of the RAM and one-hundred MB of the HDD. In this example, eight MB of the RAM and eight-hundred MB of the HDD are utilized by the code for the three functions. This leaves only two MB of the RAM and two-hundred MB of the HDD for the multifunction network device to use in operation for caching, queuing, working storage and other necessary uses.

A single-function network printer may have ten MB of RAM and a one GB HDD, of which the code for the print function utilizes three MB of the RAM and one-hundred MB of the HDD. The single-function network printer therefore has seven MB of the RAM and nine-hundred MB of the HDD to use in operation for caching, queuing, working storage and other necessary uses. This is more than three times the capacity of free RAM and HDD in the multifunction network device of the example above. Accordingly, the printing performance of the single-function network printer would be significantly greater than that of the multifunction network device in this example.

Sometimes the overall demand for a particular function in a network environment is much greater than normally experienced. For example, the network users may be in an office environment which requires them to generate reports on the last day of every work week, on which days the overall demand for printing will greatly increase in relation to the demand for faxing and scanning. As another example, the demand for faxing in a particular office environment may greatly increase during the morning as orders for the day are received and sent between companies. In these situations, a network environment having several multifunction network devices may experience limited throughput to process all of the requested print jobs or fax jobs, as the case may be, due to limited hardware capacities of the multifunction network devices to support the requested print jobs or fax jobs.

During these situations, substantial capacities of the RAM and the HDD are essentially wasted by those functions of the multifunction network device which are not currently in demand by the network users of the network environment. The wasted capacities of the RAM and the HDD hinder the ability of the multifunction network device to perform the demanded function with greater efficiency. These situations may also arise when a demand for a certain function is pre-scheduled by network users and/or system administrators. For example, the accounting department of a large office environment may schedule a large number of print jobs to begin at a certain time of a certain day of every week during off-hours. The demand of the multifunction network devices would be only for printing and it would be preferable for the multifunction network devices to perform printing of the scheduled print jobs as efficiently as possible.

In addition to the above drawbacks of typical multifunction network devices, such devices are generally pre-loaded with the firmware code to perform the multiple functions when they are manufactured. Accordingly, if a purchaser of the multifunction network device wants to use less than all of the functions of the multifunction network device, the performance of the device is hindered by the wasted RAM and HDD space consumed by those functions that the purchaser will never use. In addition, if improved firmware for one or more of the functions is generated by the manufacturer before the installation and use of the multifunction network device, the purchaser cannot obtain the benefit of the improved firmware unless it is manually installed in the multifunction network device. This can be a daunting task for a network administrator in a network environment having many multifunction network devices.

Lastly, some multifunction network devices have the ability to integrate hardware add-ons such as sorters, staplers, envelope trays, and the like. These add-ons often require upgraded or unique firmware to be loaded in the multifunction network device to support their respective functionality. Again, this is installation can be time consuming and cumbersome, especially when many multifunction network devices in a network environment require such add-ons.

SUMMARY OF THE INVENTION

The present invention addresses the foregoing problems by providing a system to dynamically reconfigure a multifunction network device based on demand for certain functional capabilities of the device. In particular, a multifunction network device, such as a combination fax/scanner/printer, is dynamically reconfigured by a configurator module on the network to have the capability to perform a different combination of functions. The configurator module can reconfigure the network device to only be capable of performing a single function or a subset of the original functions. The configurator module can also reconfigure the network device to be capable of performing a new function in addition to the original functions. The configurator module utilizes a component repository to download appropriate functional components to the network device when necessary for reconfiguration.

Accordingly, one aspect of the invention concerns managing a plurality of multifunction network devices on a network, each multifunction network device having a storage memory for storing a plurality of function modules, a program memory for use by the function modules and a processor for executing each of the function modules. A reconfiguration event is detected for one of the plurality of multifunction network devices, a reconfiguration command is sent to the one multifunction network device, the reconfiguration command selected from one of a command to delete at least one of the function modules and a command to reallocate an amount of the program memory for use by each of the plurality of function modules, and confirmation is received that the one multifunction network device has been reconfigured in accordance with the reconfiguration command.

Preferably, the reconfiguration event is detected by a configurator module which executes on a server on the network, and the reconfiguration event is detected based on an increased demand for use of the storage memory and the program memory by a designated one of the function modules by the one multifunction network device. Preferably the increased demand is determined by the configurator module based on resource utilization information which is sent from the one multifunction network device to the configurator module. In addition, the one multifunction network device preferably deletes all of the function modules except the designated function module from the storage memory and the program memory in response to the reconfiguration command. The deleted function modules are preferably downloaded from a component repository at a later time to the one multifunction network device preferably and added to the storage memory and the program memory in response to a second reconfiguration command. The second reconfiguration command is sent to the one multifunction network device when there is no longer an increased demand for use of the storage memory and the program memory by a designated one of the function modules. In addition, a newly incorporated multifunction network device can preferably be discovered by the configurator module and a set of appropriate functional modules can be downloaded to the multifunction network device from a component repository in response to an instruction from the configurator module.

By virtue of the foregoing, a plurality of multifunction network devices can be managed in an efficient manner so that their performance can be improved by offloading unnecessary functional modules when they are not needed. In this manner, when there is a high demand for use of a particular functional module in a multifunction network device, such as for printing, the other functional modules, such as scanning and faxing, can be deleted from the storage memory and from the program memory. The additional freed storage memory and program memory can then be used by the particular functional module in demand, thereby increasing the performance of the demanded functional module. In addition, the invention provides for efficient downloading of appropriate functional modules to a newly incorporated multifunction network device, thereby providing the latest updated functionality in an efficient manner to the multifunction network device.

According to anther aspect, the invention concerns managing a plurality of multifunction network devices on a network, each multifunction network device having a storage memory for storing a plurality of function modules, a program memory for use by the function modules and a processor for executing each of the function modules. A first reconfiguration event is detected for one of the plurality of multifunction network devices, the first reconfiguration event being based on an increased need for usable capacity of the storage memory and of the program memory by a designated one of the plurality of function modules, and a first reconfiguration command is sent, in response to detection of the first reconfiguration event, to the one multifunction network device, the first reconfiguration command comprised of a command to delete all of the function modules except for the designated function module from the storage memory and from the program memory of the one multifunction network device. A confirmation is received that the one multifunction network device has been reconfigured by deleting all of the function modules except the designated function module from the storage memory and from the program memory of the multifunction network device in response to first reconfiguration command. A second reconfiguration event is detected for the one multifunction network device, the second reconfiguration event being based on a decreased need for usable capacity of the storage memory and of the program memory by a designated one of the plurality of function modules, and a second reconfiguration command is sent, in response to the detected second reconfiguration event, to the one multifunction network device, the second reconfiguration command comprised of a command to download all of the function modules that were previously deleted in response to the first reconfiguration command, and to add the downloaded function modules to the storage memory and to the program memory of the one multifunction network device. A confirmation is received that the one multifunction network device has been reconfigured by downloading and adding the previously deleted function modules to the storage memory and to the program memory of the multifunction network device in response to the second reconfiguration command.

Preferably, the reconfiguration event is detected by a configurator module which executes on a server on the network. Preferably the increased demand for storage memory and program memory is determined by the configurator module based on resource utilization information which is sent from the one multifunction network device to the configurator module. In addition, the demand for storage memory and program memory can be determined by the configurator module based on pre-scheduled function use, such as, for example, the prescheduled printing of reports every evening at a specific time. In addition, the deleted function modules are preferably subsequently downloaded from a component repository. Also, a newly incorporated multifunction network device can preferably be discovered by the configurator module and a set of appropriate functional modules can be downloaded to the multifunction network device from a component repository in response to an instruction from the configurator module.

By virtue of the foregoing, a plurality of multifunction network devices can be managed in an efficient manner so that their performance can be improved by offloading unnecessary functional modules when they are not needed. In this manner, when there is a high demand for use of a particular functional module in a multifunction network device, such as for printing, the other functional modules, such as scanning and faxing, can be deleted from the storage memory and from the program memory. The additional freed storage memory and program memory can then be used by the particular functional module in demand, thereby increasing the performance of the demanded functional module. In addition, the invention provides for efficient downloading of appropriate functional modules to a newly incorporated multifunction network device, thereby providing the latest updated functionality to the multifunction network device in an efficient manner.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 8 is a table diagram depicting device profiles of multifunction network devices according to one embodiment of the present invention.

FIG. 9 is a table diagram depicting programmed device schedules according to one embodiment of the present invention.

DETAILED DESCRIPTION OF THE PREFERRED EMBODIMENTS

Figure 1:
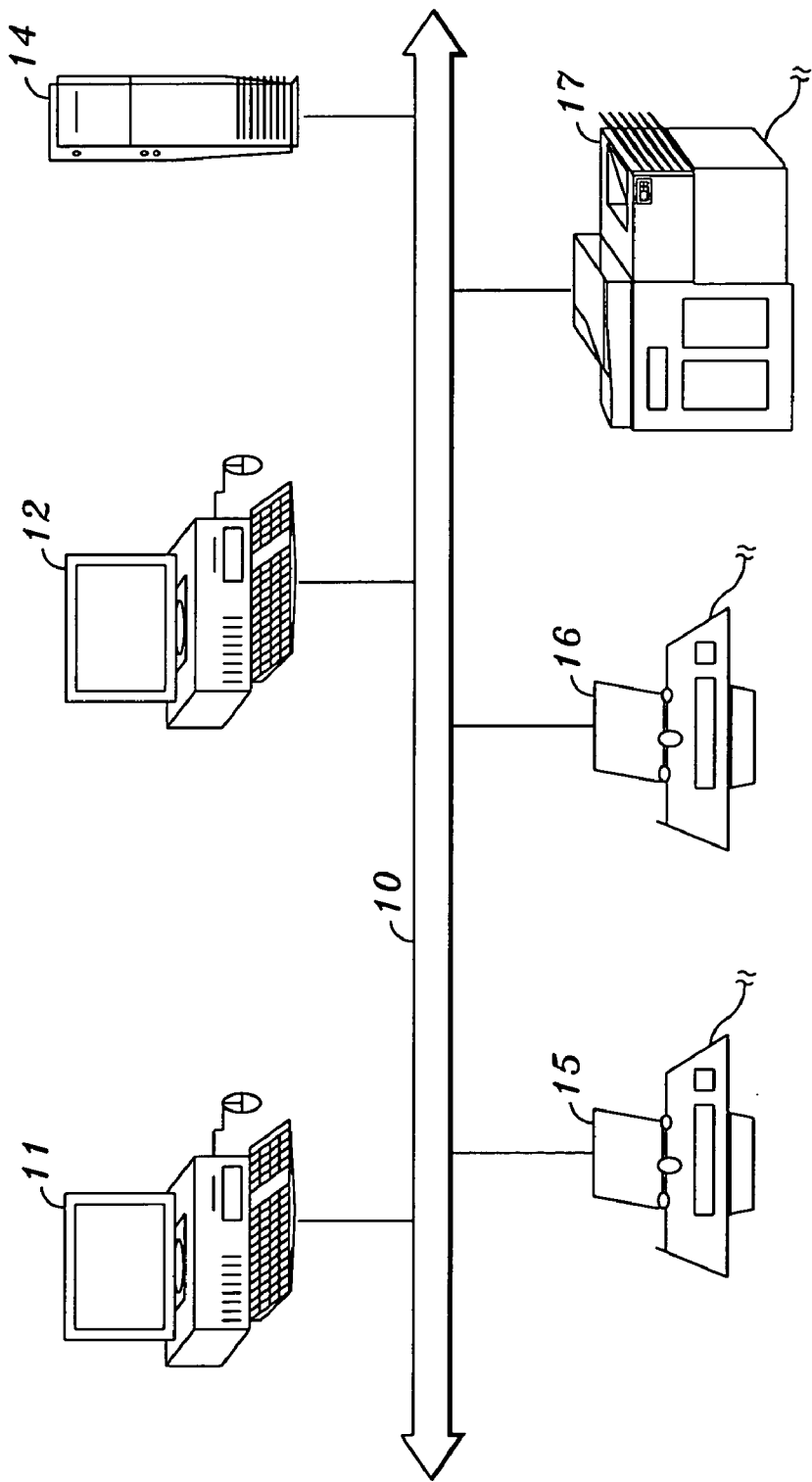
FIG. 1 is a block diagram depicting a network environment in which the present invention may be practiced according to one embodiment of the present invention.

FIG. 1 depicts a network environment in which the present invention may be practiced. As seen in FIG. 1, the network environment includes network 10, computer workstations 11 and 12, network server 14, and network multifunction devices 15, 16 and 17. Network 10 is preferably a typical network which supports TCP/IP and HTTP, as well as other protocols such as SNMP, FTP, SOAP XML, and others as discussed further herein. Computer workstations 11 and 12 are preferably typical computing devices with network interface capabilities, and preferably include a host processor unit, a monitor with a display, a keyboard and pointing device, such as a mouse, a memory storage device such as a fixed hard disk, and memory medium access devices such as a CD-ROM drive and a diskette drive.

Server 14 is preferably a typical network server with network interface capabilities, and preferably includes a host processor, a memory storage device such as a fixed hard disk, and memory medium access devices such as a CD-ROM drive and a diskette drive. Multifunction network devices 15 and 16 are preferably network printer devices with additional functional capabilities for scanning and faxing. For example, multifunction network devices 15 and 16 are preferably comprised of an ink jet printing device with an optical scanning device for scanning documents, and with fax/modem cards for faxing documents over a connected telephone line connection. Similarly, multifunction network device 17 is a larger office-type combination network printer/copier which includes a printing mechanism, a scan device, and a fax card for supporting copying, printing, scanning and faxing. It should be appreciated that the present invention can be practiced on other types of networks, and with other types of multifunction network devices which support different types of functions for access by network users.

Figure 2:
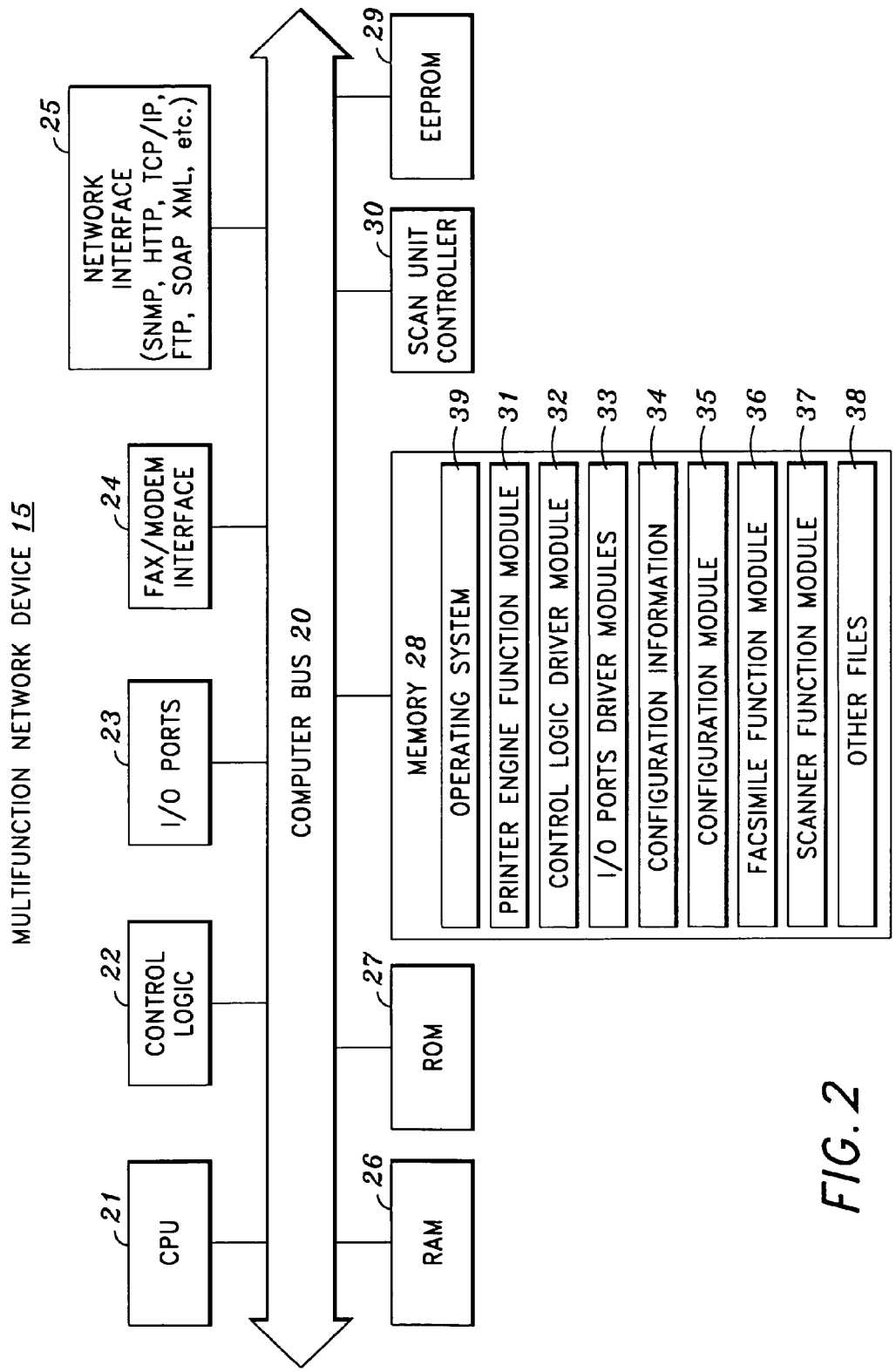
FIG. 2 is a block diagram illustrating an internal architecture of a multifunction network device according to one embodiment of the present invention.

FIG. 2 provides a depiction of the internal architecture of one of the multifunction network devices shown in the network environment of FIG. 1. In particular, multifunction network device 16 is seen to contain a central processing unit ("CPU") 21 such as a programmable microprocessor which is interfaced to device bus 20. Also coupled to device bus 20 are control logic 22, which is utilized to control the printer engine of multifunction network device 16 (not shown), I/O ports 23 which is used to communicate with various input/output devices of multifunction network device 16 (not shown), fax/modem interface 24 which is used to support fax capability for multifunction network device 16 over a telephone line connection, network interface 25 which is utilized to interface multifunction network device 16 to network 10 and scan unit controller 30 for controlling a scan unit of multifunction network device 16 to optically scan documents. Network interface 25 contains several modules to provide the appropriate interface functionality for multifunction network device 16 according to the present invention. In particular, network interface 25 contains network interface supports several protocols for implementing the present invention, including SNMP, HTTP, TCP/IP, FTP, SOAP XML and others.

Also coupled to device bus 20 are random access memory ("RAM") 26, read-only memory ("ROM") 27, fixed memory 28 and EEPROM 29. RAM 26 interfaces to device bus 20 to provide CPU 21 with access to memory storage, thereby acting as the main run-time memory for CPU 21. In particular, when executing stored program instruction sequences, CPU 21 loads those instruction sequences from fixed memory 28 (or other memory media) into RAM 26 and executes those stored program instruction sequences out of RAM 26. ROM 27 stores invariant instruction sequences, such as start-up instruction sequences for CPU 21 or BIOS sequences for the operation of various hardware components of multifunction network device 16. EEPROM 29 contains non-volatile program instructions such as functional software code for performing functions of multifunction network device 16. Accordingly, functional software may be accessed from EEPROM 29, ROM 27 or fixed memory 28.

Fixed memory 28 is one example of a computer-readable medium, such as a hard disk drive (HDD), that stores program instruction sequences executable by CPU 21 so as to constitute operating system 39, printer engine function module 31, control logic driver module 32, I/O port driver modules 33, configuration information 34, configuration module 35, facsimile function module 36, scanner function module 37, and other files 38. Operating system 39 may be a DOS, Unix, LINUX, or windowing-based operating system, or some other type of operating system, for managing the execution of instruction sequences by CPU 21. Printer engine function module 31 and control logic driver module 32 are utilized to control and drive the printer engine (not shown) of multifunction network device 16 so as to print an image according to image data received by multifunction network device 16, preferably over network 10. I/O ports driver modules 33 are utilized to drive any input and output devices (not shown) connected through I/O ports 23. Configuration information 34 is provided to contain network settings for multifunction network device 16, such as its IP address, and also to contain information related to the current functional capabilities of multifunction network device 16, such as printing, scanning, faxing and the like. In this regard, facsimile function module 36 is utilized by multifunction network device 16 to support facsimile functionality through fax/modem interface 24, and scanner function module 37 is utilized by multifunction network device 16 to support scanning functionality through scan unit controller 30. Finally, other files 38 are used to provide other information and programs necessary for the operation and functionality of multifunction network device 16. As mentioned above, the present invention can also support other types of multifunction network devices which support different combinations of functionality for access and use by network users.

Figure 3:
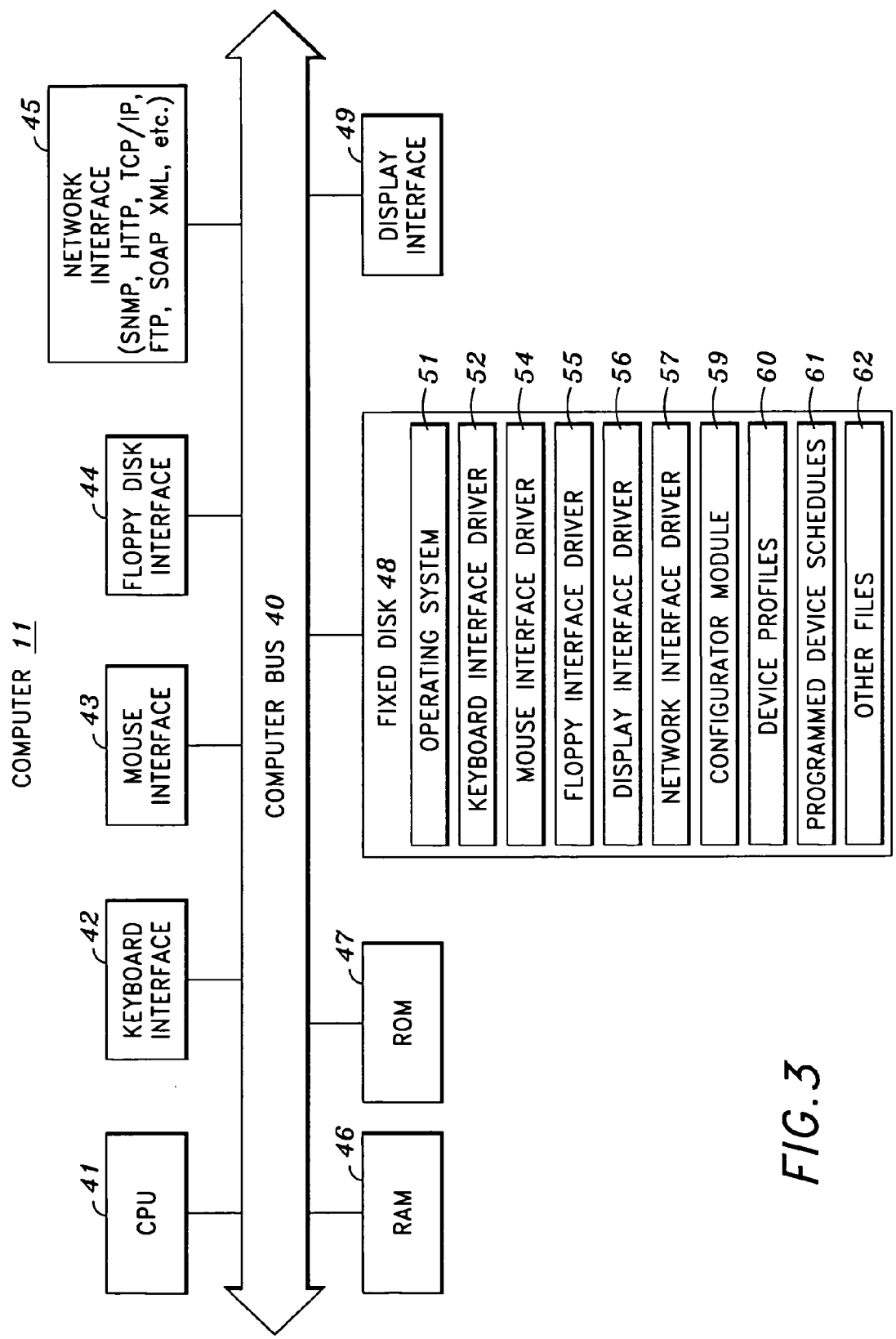
FIG. 3 is a block diagram illustrating an internal architecture of a network computing device for hosting a configurator module according to one embodiment of the present invention.

FIG. 3 is a block diagram showing an overview of the internal architecture of computer 11 of the network environment of FIG. 1. Computer 11 is used in the network environment of FIG. 1 to implement configurator module 59 for monitoring the status of multifunction network devices 15, 16 and 17. In FIG. 3, computer 11 is seen to include central processing unit (CPU) 41 such as a programmable microprocessor which is interfaced to computer bus 40. Also coupled to computer bus 40 are keyboard interface 42 for interfacing to a keyboard, mouse interface 43 for interfacing to a mouse pointing device, floppy disk interface 44 for interfacing to a floppy diskette, display interface 49 for interfacing to a display, and network interface 45 for interfacing to network 10. Network interface 45 contains several modules (not shown) to provide the appropriate network interface functionality for computer 11 according to the present invention. In particular, network interface 45 supports a plurality of network protocols for implementing the present invention, such as SNMP, HTTP, TCP/IP, FTP, SOAP XML, and other protocols.

Random access memory ("RAM") 46 interfaces to computer bus 40 to provide central processing unit ("CPU") 41 with access to memory storage, thereby acting as the main run-time memory for CPU 41. In particular, when executing stored program instruction sequences, CPU 41 loads those instruction sequences from fixed disk 48 (or other memory media) into random access memory ("RAM") 46 and executes those stored program instruction sequences out of RAM 46. It should also be noted that standard-disk swapping techniques available under windowing operating systems allow segments of memory to be swapped to and from RAM 46 and fixed disk 48. Read-only memory ("ROM") 47 stores invariant instruction sequences, such as start-up instruction sequences for CPU 41 or basic input/output operation system ("BIOS") sequences for the operation of peripheral devices attached to computer 11.

Fixed disk 48 is one example of a computer-readable medium that stores program instruction sequences executable by central processing unit ("CPU") 41 so as to constitute operating system 51 which is preferably a windowing operating system, such as Windows 2000, Windows 98, Windows 95, and Windows NT, although other types of operating systems such as DOS, UNIX and LINUX may be used with the present invention. Also provided on fixed disk 48 is keyboard interface driver 52 for driving keyboard interface 42, mouse interface driver 54 for driving mouse interface 43, floppy disk interface driver 55 for driving floppy disk interface 44, display interface driver 56 for driving display interface 49, and network interface driver 57 for driving network interface 45. Configurator module 59 is also provided on fixed disk 48 for implementing the dynamic reconfiguration of multifunction network devices, as discussed more fully herein. Device profiles 60 is provided on fixed disk 48 and contains device profiles corresponding to the multifunction network devices on network 10 for tracking the type of functions supported by each of the devices and the appropriate function module for implementing each such function. The use of device profiles 60 for implementing the present invention is described more fully herein. Fixed disk 48 also includes programmed device schedules 61 which contains programmed schedules according to which multifunction network devices on network 10 are to be reconfigured for supporting different combinations of functionality. The use of programmed device schedules 61 for implementing the present invention is described more fully herein. Finally, other files 62 is also provided of fixed disk 48 and contains other information and programs necessary for computer 11 to operate and to add additional functionality to computer 11.

Figure 4:
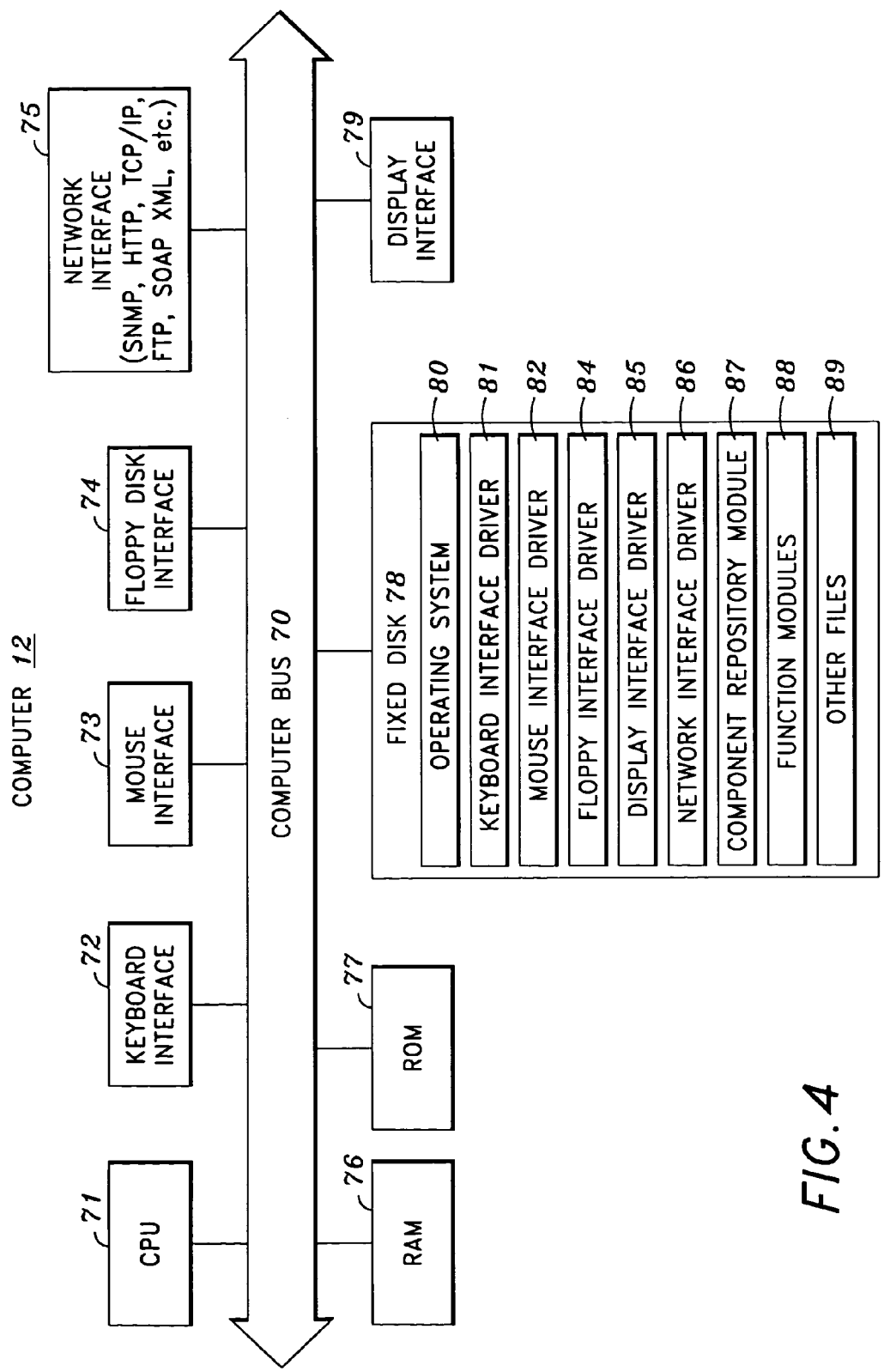
FIG. 4 is a block diagram illustrating an internal architecture of a network computing device for hosting a component repository module according to one embodiment of the present invention.

As seen in FIG. 4, computer 12 contains an internal architecture substantially similar to that of computer 11 described above with respect to FIG. 3, except for the software modules contained on fixed disk 78 of computer 12. Accordingly, the internal architecture of computer 12 as shown in FIG. 4 will not be described herein for the sake of brevity, except for the different software modules of fixed disk 78. In particular, component repository module 87 and function modules 88 are present on fixed disk 78 of computer 12, instead of configurator module 59, device profiles 60 and programmed device schedules 61 which are present on fixed disk 48 of computer 11. Component repository module 87 is utilized to implement the present invention by controlling the downloading of functional modules to multifunction network devices on network 10, as described more fully herein. In another aspect of the invention, component repository module 87 can also act as a temporary storage site by receiving function modules from multifunction network devices, as also discussed herein. Function modules 88 contains a plurality of different function modules for use by the multifunction network devices on network 10, including different versions of each particular function module. The use of function modules 88 to implement the present invention is discussed more fully herein.

Although the software components for implementing the present invention are divided between computers 11 and 12, it should be appreciated that the software components can also be located in a single computer, such as computer 11, for implementing the present invention. For example, fixed disk 48 of computer 11 could contain component repository module 87, function modules 88, configurator module 59, device profiles 60 and programmed device schedules 61 for monitoring the multifunction network devices of network 10 and controlling the dynamic reconfiguration of such devices as needed.

Figure 5:
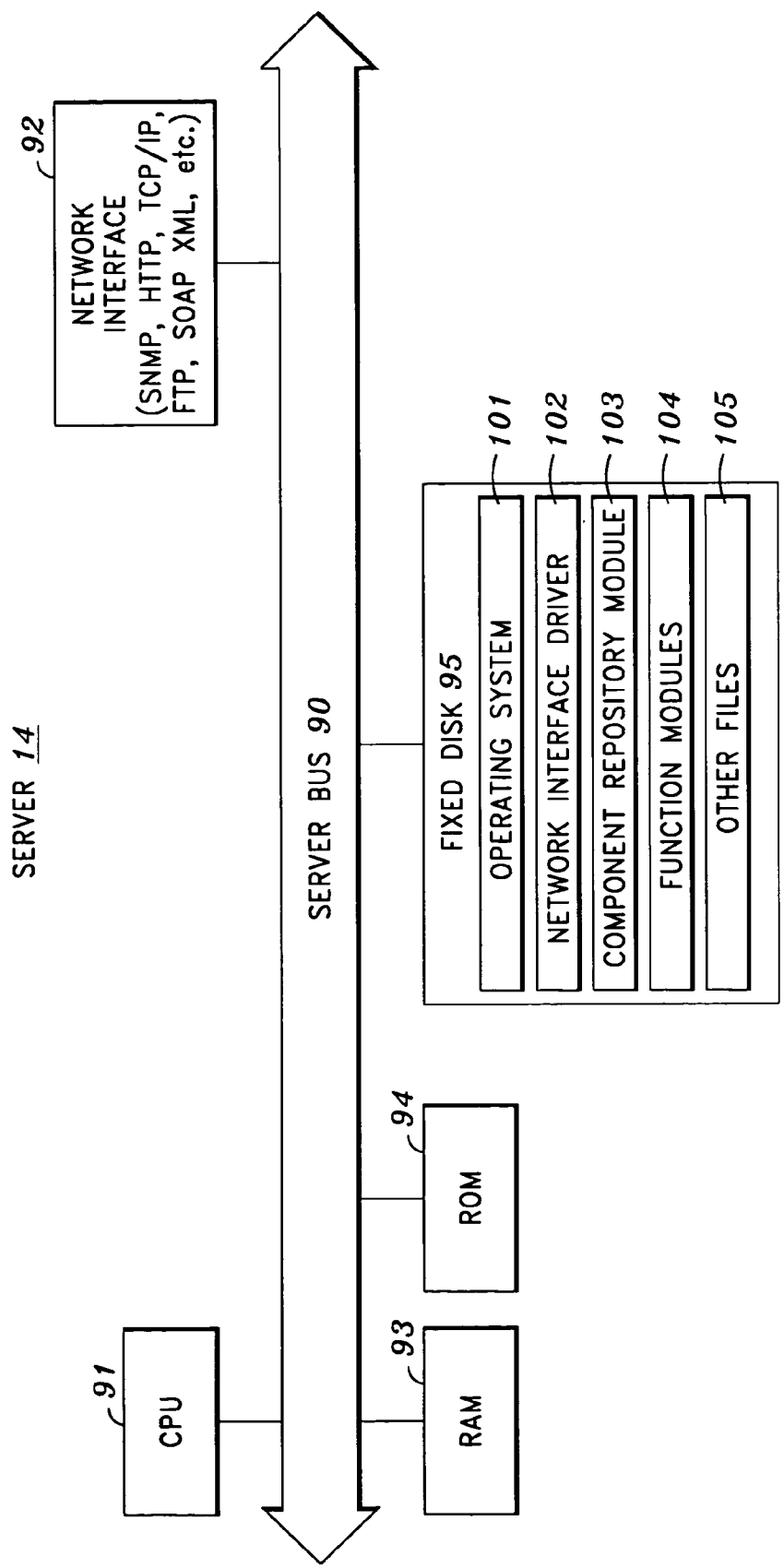
FIG. 5 is a block diagram illustrating an internal architecture of a network server for hosting a component repository module according to one embodiment of the present invention.

In a similar fashion, other computing devices can be present on network 10 which provide duplicate services for implementing the present invention. In this regard, FIG. 5 shows the internal architecture of network server 14 which effectively provides the same functionality to implement the present invention as that of computer 12 shown in FIG. 4. In this manner, function modules can be downloaded from either computer 12 or from network server 14 to the multifunction network devices on network 10. In FIG. 5, server 14 is seen to include a central processing unit ("CPU") 91 such as a programmable microprocessor which is interfaced to server bus 90. Also coupled to server bus 90 is a network interface 92 for interfacing to network 10. In addition, random access memory ("RAM") 93, read-only ("ROM") 94, and fixed disk 95 are also coupled to server bus 90. RAM 93 interfaces to server bus 90 to provide CPU 91 with access to memory storage, thereby acting as the main run-time memory for CPU 91. In particular, when executing stored program instruction sequences, CPU 91 loads those instruction sequences from fixed disk 95 (or other memory media) into RAM 93 and executes those stored program instruction sequences out of RAM 93. It should also be recognized that standard disk-swapping techniques allow segments of memory to be swapped to and from RAM 93 and fixed disk 95. ROM 94 stores invariant instruction sequences, such as start-up instruction sequences for CPU 91 or basic input/output operating system ("BIOS") sequences for the operation of peripheral devices (not shown) which may be attached to network server 14. Network interface 92 contains several modules to provide the appropriate network interface functionality for network server 14 according to the present invention. In particular, network interface 92 supports a plurality of network protocols for implementing the present invention, including SNMP, HTTP, TCP/IP, FTP, SOAP XML, and others.

Fixed disk 95 is one example of a computer-readable medium that stores program instruction sequences executable by CPU 91 so as to constitute operating system 101, network interface driver 102, component repository module 103, function modules 104, and other files 105. As mentioned above, operating system 101 can be a windowing operating system such as Windows 95, Windows 98, Windows 2000, Windows NT, or another type of operating system such as DOS, UNIX, or other operating system. Network interface driver 102 is utilized to drive network interface 92 for interfacing network server 14 to network 10. Component repository module 103 and function modules 104 are used to implement the functionality of the present invention and, as mentioned above with respect to computer 12 of FIG. 4, are discussed more fully herein. Lastly, other files 48 contains other files or programs necessary to operate network server 14 and/or to provide additional functionality to network server 14.

Figure 6:
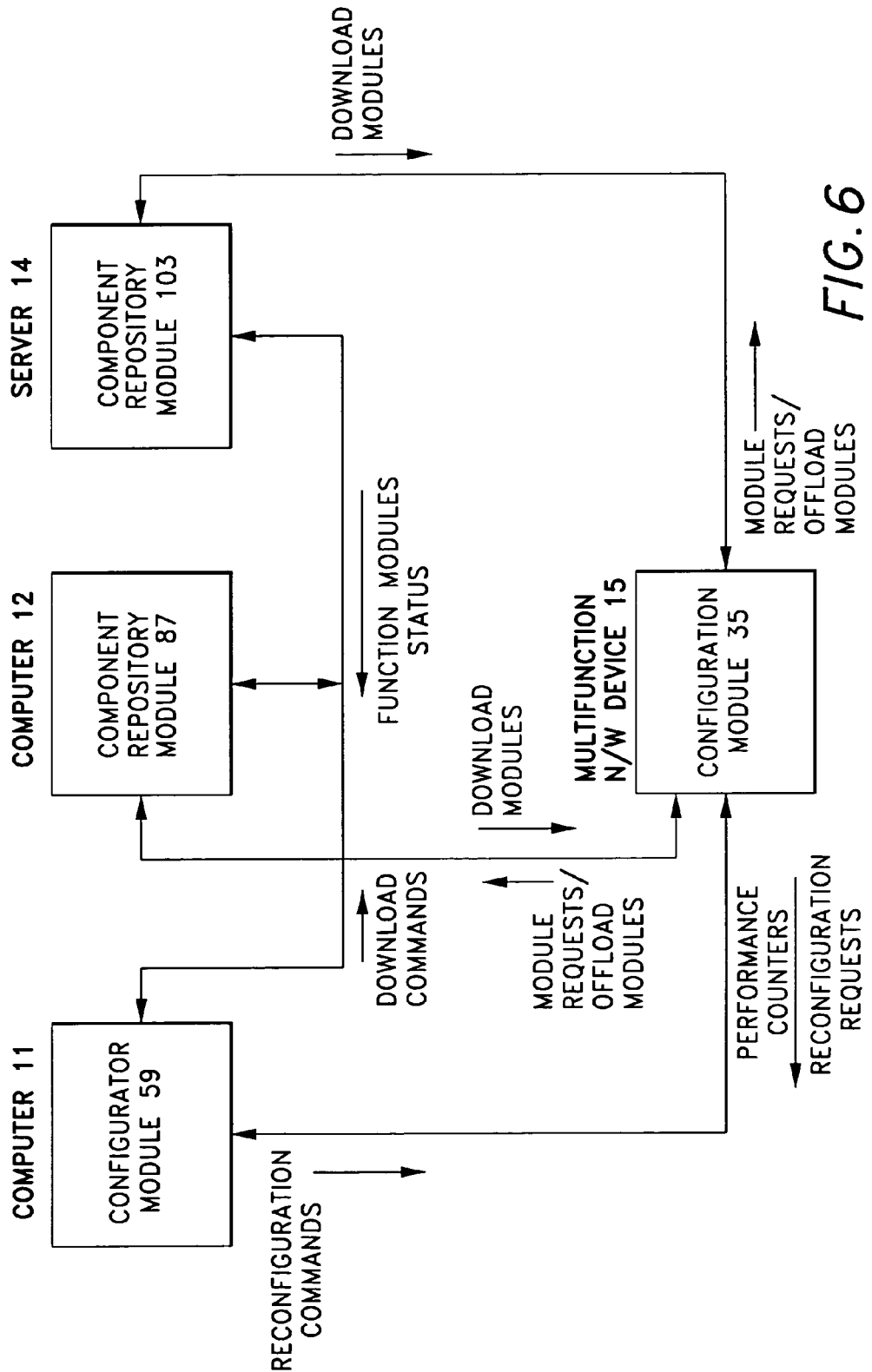
FIG. 6 is a block diagram depicting functional relationships among a multifunction network device, a configurator module and component repository modules according to one embodiment of the present invention.

FIG. 6 is a block diagram which depicts the interrelationships between the key software modules which are used to implement the present invention. Specifically, FIG. 6 shows the top-level interaction between configurator module 59 of computer 11, component repository modules 87 and 103 of computers 12 and 14, respectively, and configuration module 35 of multifunction network device 15. Configurator module 59 is used to monitor the status of all multifunction network devices on network 10 to determine if one or more of the multifunction network devices need to be reconfigured based on demand for hardware resources of the multifunction network devices. In this regard, configurator module 59 monitors network traffic (not shown) on network 10 to monitor network messages from network users which contain demands for functional services of the multifunction network devices, such as printing, faxing or scanning. Configurator module 59 also receives performance counters from the configuration module in each of the multifunction network devices which indicate the current amount of HDD, ROM, RAM and CPU which are being utilized by the particular multifunction network device.

Configurator module 59 then analyzes the service demands of each multifunction network device to determine if the demand for one functional service substantially outweighs the demand for other functional services, and if the received performance counters from the multifunction network device indicate that more capacity of the HDD, ROM, RAM and CPU are desirable for performing the one functional service in high demand. If so, configurator module 59 sends a reconfiguration command to the configuration module of the given multifunction network device instructing the multifunction network device to reconfigure itself by deleting the other functional services from its memory and CPU, thereby dedicating the HDD, ROM, RAM and CPU for exclusive use by the one functional service which is in high demand. In this manner, the particular multifunction network device has access to the full capacities of its memories and CPU to more efficiently perform the one functional service which is currently in high demand by network users.

For example, configurator module 59 may detect a large number of print job requests being sent to multifunction network device 15, and may receive performance counters from configuration module 35 of multifunction network device 15 which indicate that the amount of HDD, RAM and CPU allocated for use by the printer engine functional module are limiting the ability of multifunction network device 15 to complete the print jobs in an efficient and timely manner. Accordingly, configurator module 59 sends a reconfiguration command to configuration module 35 of multifunction network device 15 which contains a "delete" command for multifunction network device to delete all functional modules from its HDD, ROM, RAM and CPU, and to reallocate all of these resources for exclusive use by printer engine functional module. Multifunction network device 15 can then complete the print jobs more quickly and efficiently by utilizing the full capacities of its HDD, ROM, RAM and CPU for printing only. Configurator module 59 also uses other conditions to send a reconfiguration command to one or more of the multifunction network devices, such as a reconfiguration request from the device itself or a prescheduled programmatic trigger. Each of these conditions are discussed more fully herein.

Eventually, configurator module 59 detects, based on monitored network traffic, that there is no longer a high demand for one particular functional service of multifunction network device 15 which substantially outweighs the demand for other functional services. Configurator module 59 then sends a reconfiguration command to configuration module 35 of multifunction network device 15 containing an "addition" command to download the previously deleted functional modules. Preferably, configurator module 59 includes the address in the reconfiguration command, such as a URL, of either component repository module 87 in computer 12 or component repository module 103 in computer 14. In addition, configurator module 59 preferably includes an identification for each of the functional modules which are to be downloaded to multifunction network device 15. In particular, configurator module 59 accesses a device profile for multifunction network device 15 from device profiles 60 to determine which function modules are supported by multifunction network device 15, and which version of each of function module should be downloaded. Configurator module 59 then passes this information to multifunction network device 15 in the reconfiguration "addition" command, and configuration module 35 of multifunction network device 15 then uses the address in the reconfiguration command to contact the appropriate one of component repository modules 87 and 103 for requesting a download of the identified function module versions.

For example, configuration module 35 of multifunction network device 15 obtains the address of component repository module 87 from the reconfiguration "addition" command, along with the identifications of the specific versions of function modules which are to be downloaded from component repository module 87. Configuration module 35 of multifunction network device 15 then contacts component repository module 87 in computer 12 and requests a download of each of the identified function module versions. Component repository module 87 then downloads each of the identified function module versions to multifunction network device 15 upon which multifunction network device 15 stores each downloaded function module in its HDD, memory 28, and reallocates RAM 26 and CPU 21 to accommodate support for the newly-downloaded function modules. In addition, multifunction network devices 16 updates operating system 39 to reflect support for the newly-downloaded function modules. In this manner, multifunction network device 15 is reconfigured to include support for all service functions which it originally supported, such as printing, scanning and faxing.

In another aspect of the invention, configurator module 59 is notified by one of component repository modules 87 and 103 that a new version of function module, such a printer engine function module, has been released for use by one of the multifunction modules on network 10. Configurator module 59 then sends a download command directly to the component repository module and instructs it to download the new function module version to the appropriate multifunction network device which then replaces the previous version of the function module with the new function module version. In this manner, manufacturers and developers can upgrade functional software of a multifunction network device by uploading the new function module version to a component repository module. Configurator module can also send a download command to a component repository module to download one or more function module versions to a newly-discovered multifunction network device on network 10 in order to make the newly-discovered multifunction network device operational. In addition, according to another aspect of the invention, a multifunction network device can operate in standalone mode by which it can determine on its own that it needs more resources dedicated to a designated function module, such as the printer engine function module. In this aspect, the multifunction network device contacts a component repository module and offloads all other function modules to the component repository module, thereby deleting all function modules except for the designated function module from the HDD, ROM, RAM and CPU of the multifunction network device. When the multifunction network device later determines that it can support the other service functions, it again contacts the component repository module and downloads all of the previously offloaded function modules, upon which it reallocates resources to each of the function modules and updates the operating system accordingly. These additional aspects of the invention are discussed in more detail.

Returning to FIG. 6, it can be seen that configurator module 59 interacts with configuration module 35 of multifunction network device 15 by sending configuration commands to configuration module 35 and receiving performance counters from configuration module 35. Configurator module 59 also receives reconfiguration requests directly from configuration module 35 of multifunction network device 15 when multifunction network device 15 wishes to initiate its reconfiguration. Configuration module 35 interacts with component repository modules 12 and/or 14 by sending module requests for requesting download of specified function module versions to configuration module 35 for implementation in multifunction network device 15. The appropriate component repository module then downloads the specified function modules to multifunction network device 15.

Configuration module 35 can also facilitate the offloading of function modules to component repository modules 12 and/or 14 when multifunction network device 15 is acting in a standalone reconfiguration mode. In this mode, configuration module subsequently contacts the same component repository module at a later time to retrieve and implement the previously offloaded function modules. Configurator module 59 interacts with each of component repository modules 87 and 103 by receiving function modules status from them which indicates the type and version of each function module facilitated by the component repository module. Configurator module 59 uses this information to determine whether or not a reconfiguration of a multifunction network device can be supported. Configuration module 59 also uses this information to determine whether to send a download command to the component repository module to download a specified function module version to a multifunction network device, such as when a new function module version is released or when a new multifunction network device is discovered on network 10 which needs function modules downloaded to be operational.

The communications between the various components depicted in FIG. 6 are preferably performed using common network protocols. For example, the performance counters and reconfiguration requests are preferably sent from configuration module 35 of multifunction network device 15 to configurator module 59 of computer 11 using SNMP. Similarly, reconfiguration commands are preferably sent from configurator module 59 of computer 11 to configuration module 35 of multifunction network device 15 using SNMP. Module download requests are also preferably sent via SNMP from multifunction network device 15 to component repository module 87 of computer 12 or component repository module 103 of server 14. Communications between configurator module 59 and component repository module 87 of computer 12 or component repository module 103 of server 14, such as download commands and function modules status, are also preferably sent using SNMP. However, transfers of function modules, such as download of modules to a multifunction network device and offload of function modules from a multifunction network device, are preferably performed in file transfer protocol (FTP) or a specialty industry protocol such as SOAP XML. It can be appreciated that other known protocols can be used for supporting the communications between the components depicted in FIG. 6, and the present invention is not limited to use of only the protocols described above.

Figure 7:
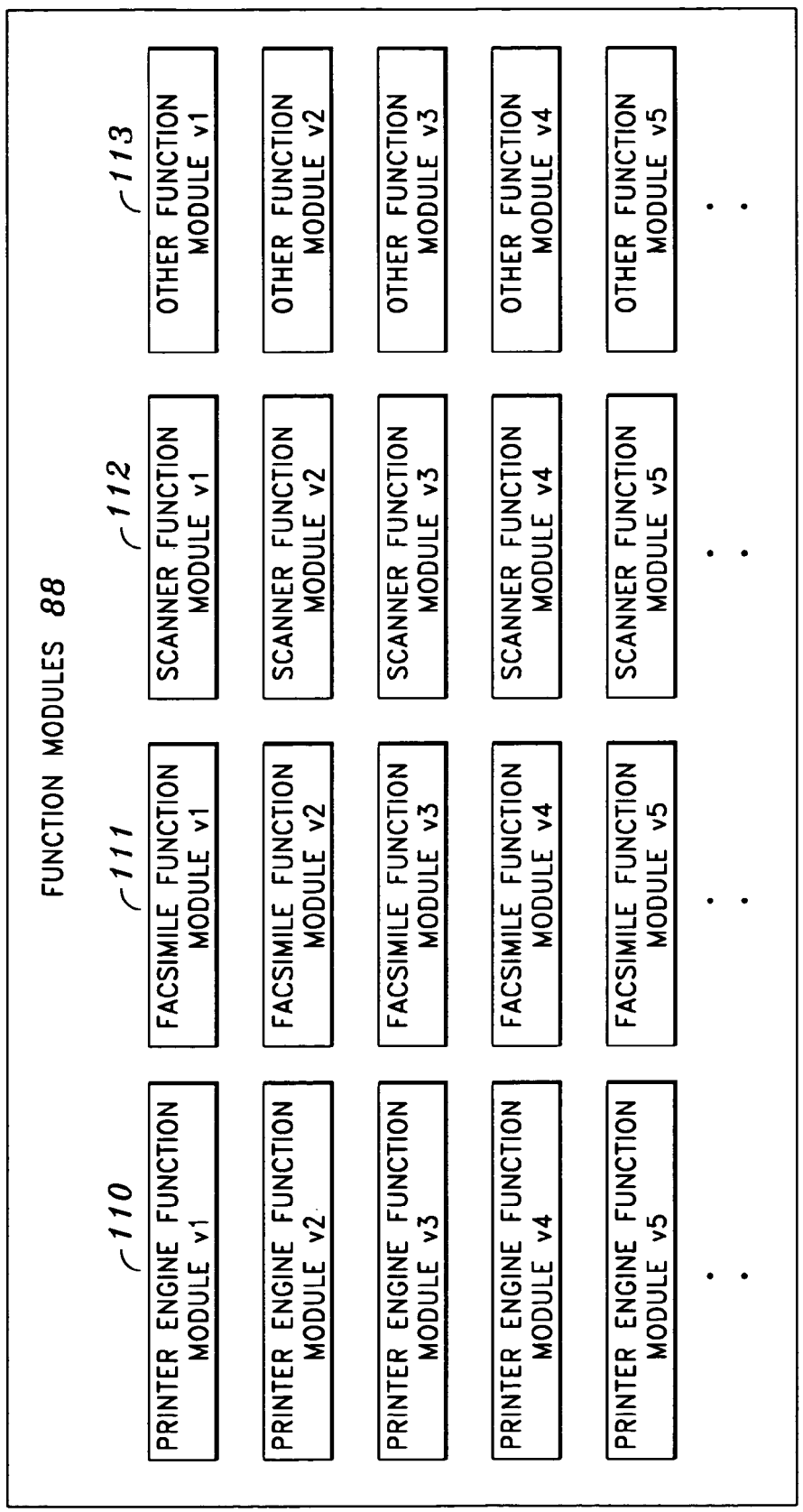
FIG. 7 is a block diagram depicting function modules managed by a component repository module according to one embodiment of the present invention.

FIG. 7 depicts function modules 88 of computer 12, which is similar to function modules 104 of server 14. As seen in FIG. 7, the columns of function modules 88 represent different types of function modules for use in multifunction network devices to support respective service functions. Column 110 represents function modules for supporting print services, column 111 represents function modules for supporting fax services, column 112 represents function modules for supporting scan services, and column 113 represents function modules for supporting other services. Each column contains a plurality of versions for a given type of function module. For example, five versions of each type of function module are present in columns 110 to 113 of function modules 88. The plurality of versions are present for several reasons. Some versions may simply be newer, updated versions of the function module which are released by the manufacturer and/or developer to correct problems and implement new functionality. Other versions may support different types of operating system software environments in various multifunction network devices. In addition, different versions of function modules may be required for multifunction network devices of different manufacturers and of different models.

Preferably, information related to each function module version in function modules 88 is tracked by component repository module 87, such as information related to the manufacturer(s), model(s) and operating system(s) supported by each function module version. In this manner, component repository module 87 can efficiently identify an appropriate function module version when present with a download request from configurator module 59 or from a multifunction network device directly. Function modules 88 can also be used to receive and store a function module version from a multifunction network device which is acting in a standalone reconfiguration mode, as discussed above. In such a situation, the multifunction network device offloads the function module version to function modules 88 which then stores the function module version in an appropriate column of depending on the type of the function module version. Configurator module 59 can then efficiently access the offloaded function module version when subsequently requested by the multifunction network device and download it to the function module version.

FIG. 8 is a table for illustrating device profiles 60 from fixed disk 48 of computer 11. In particular, device profiles 60 maintains a device profile of each multifunction network device on network 10. Each device profile contains information related to the service functions supported by the corresponding multifunction network device, as well as an identification of the function module version required by the multifunction network devices to support each service function. In addition, the manufacturer and model of the multifunction network device is preferably stored in the corresponding device profile so that configurator module 59 can access all device profiles by manufacturer and/or model identification. The information in each device profile may be entered by a network user such as a system administrator, or may be obtained by configurator module 59 directly from each multifunction network device by using SNMP request messages, or similar techniques. For example, configurator module 59 may request the information of the device profile when the corresponding multifunction network device is discovered on network 10 by computer 11 using known discovery techniques using TCP/IP and/or SNMP. The discovery function may be performed by configurator module 59 or by a separate discovery module in computer 11, or by another computing device or server on network 10. In any case, the discovered information can be used to create a device profile corresponding to the multifunction network devices.

Turning to FIG. 8, column 120 represents the device identification of the multifunction network device corresponding to the device profile. The device identification is preferably the IP address or MAC address of the multifunction network device, but may be a unique identification assigned by configurator module 59. Columns 121 and 122 are the device manufacturer and model identifiers for the multifunction network devices corresponding to the device profile. Columns 123 to 126 represent the function module version which is required by the multifunction network device to support printing, scanning, faxing and other functions, respectively, if that particular function is supported by the multifunction network device.

For example, the third device profile entry of device profiles 60 has a device id of 00000003 and represents a multifunction network device which is made by Jones, Inc. and which is model xyz-1.

The third device profile indicates that the multifunction network device supports printing, scanning and faxing, but not other functions. As also seen in columns 123 to 125 of the third device profile, the multifunction network device requires version number one of the printer function module, scanner function module and facsimile function module for each of those service functions. In this manner, each device profile in device profiles 60 provides configurator module 59 with the necessary information to identify the service functions supported by a given multifunction network devices, as well as the specific function module versions required by the multifunction network device to implement those functions. Accordingly, configurator module 59 can pass the identification of the required function module versions in a reconfiguration command to the corresponding multifunction network device in order for the multifunction network device to download the correct needed function module versions from component repository module 87. In addition, configurator module 59 can use the information in device profiles 60 to determine whether to initiate the download of updated function module versions to the multifunction network devices. Preferably, the device profiles can also be used by a system administrator to limit the service functions that a given multifunction network device can support. For example, even if a multifunction network device is capable of supporting printing, scanning and faxing, a system administrator can modify the corresponding device profile to indicate that the multifunction network device does not support scanning, thereby preventing a scan functional module from being downloaded to the multifunction network device upon its discovery by configurator module 59. Such functional limitations can be set by the system administrator based on hardware capabilities of the multifunction network device, and on schedules and management policies.

FIG. 9 is a depiction of programmed device schedules 61 of fixed disk 48 of computer 11. Programmed device schedules 61 is used by a network user, such as a system administrator, to schedule reconfiguration events for one or more multifunction network devices. For example, the accounting department of a business may send numerous print jobs for printing of invoices every evening at 5:00 p.m. on the multifunction network devices located in the accounting department. The system administrator can therefore schedule a reconfiguration event to occur on a daily basis at 5:00 p.m. for the multifunction network devices in the accounting department to reconfigure to delete all function modules except the print function module. The reconfiguration event includes a stop time, such as 10:00 p.m., at which time a second reconfiguration command is sent to the same multifunction network devices instructing them to download and add the function modules back to their hardware resources. In this manner, multifunction network devices can be scheduled for reconfiguration at specific times to accommodate a predicted increase or decrease in demand for certain service functions of the multifunction network device.

Such a reconfiguration event is depicted in the first reconfiguration schedule in programmed device schedules 61 of FIG. 9. Column 130 of programmed device schedules 61 represents the department in which the multifunction network devices are to be reconfigured according to the remaining parameters of the given reconfiguration schedule. Of course, the multifunction network devices can be grouped by designations other than by department and are not limited to the format shown in FIG. 9. Column 131 is the device id(s) of those multifunction network devices that are to be affected by the reconfiguration event. For example, in the first reconfiguration schedule, all multifunction network devices in the accounting department are to be reconfigured. In the alternative, specific device ids can be specified in column 131 to identify specific multifunction network devices which are to be affected by the reconfiguration schedule. Column 132 is the rate at which the reconfiguration schedule is to occur, such as daily, weekly, monthly or only once. Columns 133 and 134 represent the start and stop times of the reconfiguration schedule, respectively. If the schedule rate is daily, then only a time of day need is necessary in each of these columns. If the schedule rate is weekly, then a weekday and time must be provided in each of these columns. If the schedule rate is monthly, then a specific day of the month and a time must be provided in each of these columns. Finally, if the schedule rate is once only, then a specific calendar date and a time must be provided in each of these columns. Column 135 of programmed device schedules 61 is the scheduled function(s) which the identified multifunction network devices are to be reconfigured to support at the specified times.

For example, the first reconfiguration schedule indicates that all multifunction network devices of the accounting department are to delete all function modules except the print function module every day at 5:00 p.m. until 10:00 p.m, at which time the multifunction network devices download the previously deleted function modules to restore all service functions. Similar reconfiguration schedules are depicted in entries two through seven of programmed device schedules 61, although the schedule rate varies among daily, weekly, monthly and once only in these entries. The last reconfiguration schedule depicted in programmed device schedules 61 depicts a reconfiguration event in which the scheduled function in column 135 requires the specified multifunction network devices to download updated function modules. Such a reconfiguration event preferably coincides with the known schedule at which new updated function module versions are provided to function modules 88 (or 104). In this manner, the multifunction network devices on network 10 are updated automatically on a scheduled basis, thereby saving effort and time on the part of the system administrator. The reconfiguration schedules of programmed device schedules 61 are monitored by configurator module 59 to determine if a reconfiguration event is triggered, at which point configurator module 59 sends appropriate reconfiguration commands to the specified multifunction network devices.

Figure 10:
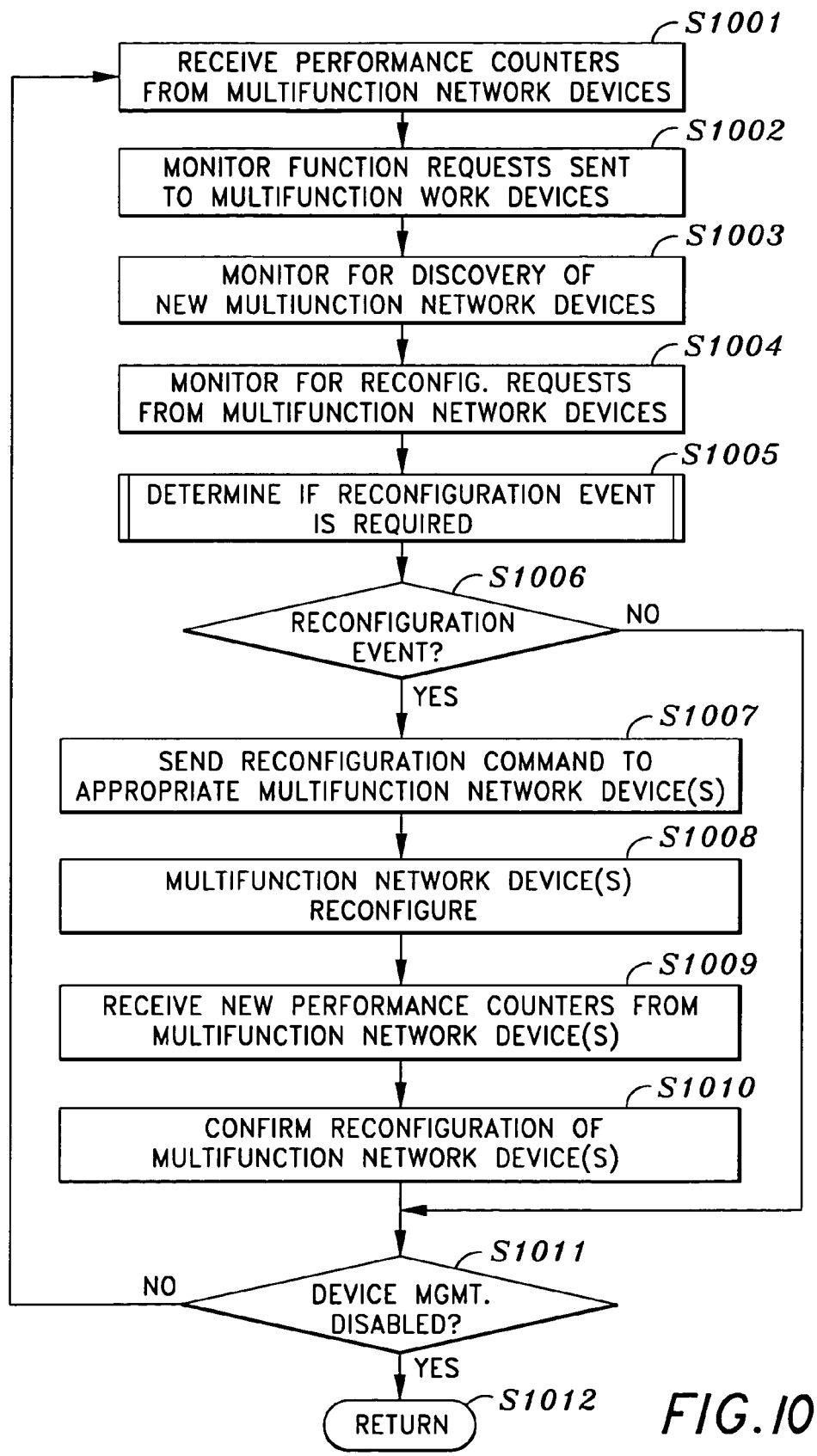
FIG. 10 is a flowchart for explaining the dynamic reconfiguration of multifunction network devices according to one embodiment of the present invention.

FIG. 10 is a flowchart which explains the dynamic management and reconfiguration of multifunction network devices by configurator module 59 according to the present invention. In step S1001, configurator module 59 receives performance counters from the multifunction network devices on network 10 which preferably indicate the present capacity of the hardware resources being utilized in each multifunction network device. Preferably, the performance counters are sent by SNMP messages which are trapped by computer 11 at the network interface level and passed to configurator module 59. In step S1002, configurator module 59 monitors network traffic on network 10 and listens for service function demands being sent to the multifunction network devices, such as print jobs and the like. Preferably, known listening techniques such as traps and the like are used. Next, configurator module 59 also monitors for discovery of newly-present multifunction network device on network 10 by utilizing known discovery methods, as discussed above (step S1003). In step S1004, configurator module 59 monitors for reconfiguration requests which are sent directly from one or more of the multifunction network devices to computer 11. Configurator module 59 then determines whether a reconfiguration event is required for any reason (step S1005). This determination process is discussed in more detail with respect to FIG. 11 in which step S1005 is more thoroughly depicted.

In step S1006 it is determined if a reconfiguration event was set by configurator module 59. If not, flow passes to step S1011, and if so, flow passes to step S1007 in which configurator module 59 sends an appropriate reconfiguration command to the appropriate multifunction network devices, upon which the multifunction network devices reconfigure in response to the reconfiguration command (step S1008). Configurator module 59 then receives new performance counters from the reconfigured multifunction network devices in step S1009. Configurator module 59 then confirms the reconfiguration of the multifunction network devices based on the newly-received performance counters which reflect the allocation of the hardware resources of each multifunction network device, preferably in correspondence with the most recent reconfiguration command (step S1010). Flow then passes to step S1011 in which it is determined if configurator module 59 is to continue management of the multifunction network devices. For example, configurator module 59 may be scheduled to run only at certain times, or may be enabled and disabled by a network user, such as a system administrator. If configurator module 59 is no longer managing the multifunction network devices, then flow passes to return in step S1012. If configurator module 59 is continuing to manage the multifunction network devices, then flow passes to return in step S1001 and steps S1001 through S1011 are repeated.

Figure 11:
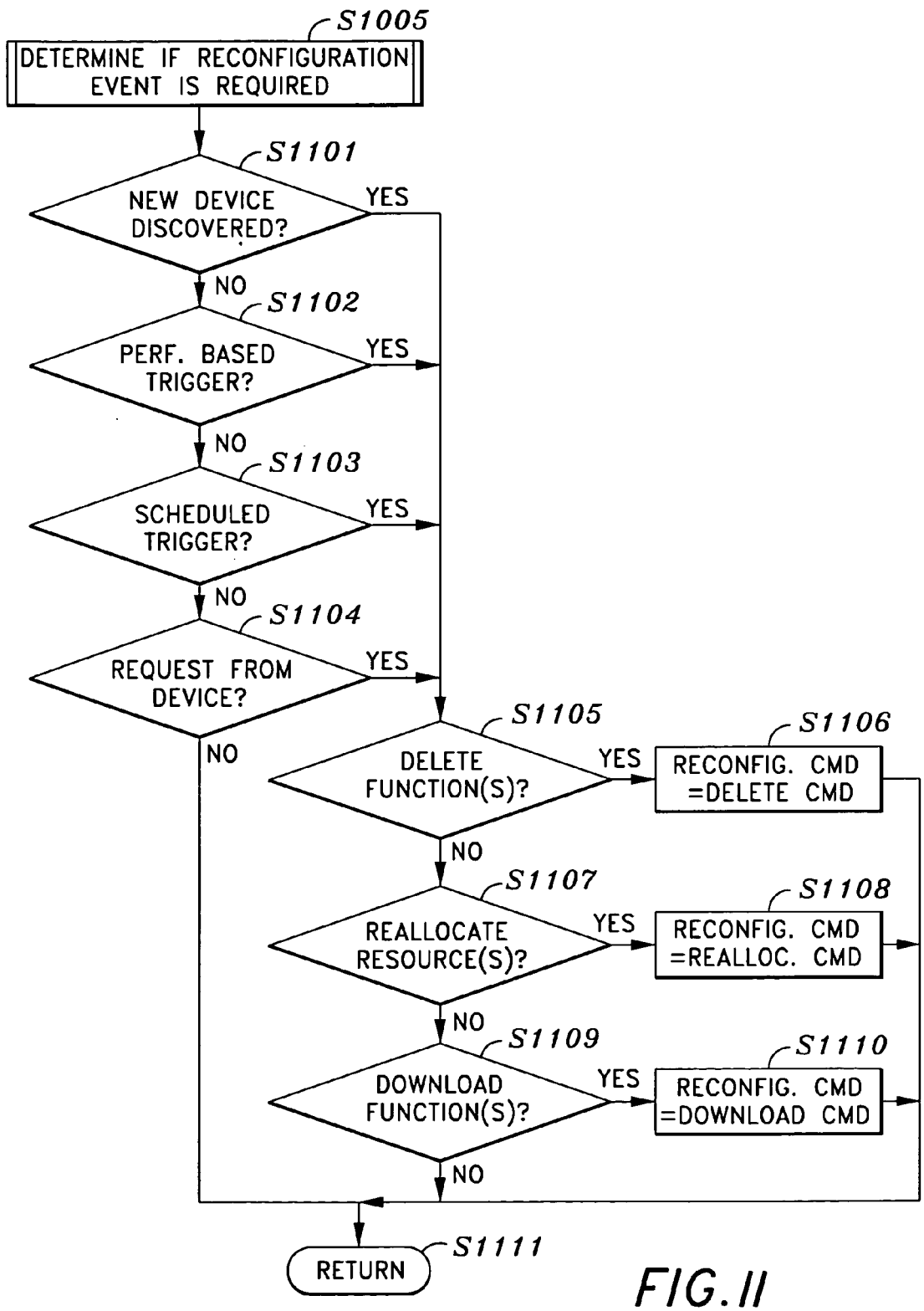
FIG. 11 is a flowchart for explaining the determination of a reconfiguration event according to one embodiment of the present invention.

FIG. 11 provides a flowchart for explaining the determination of a reconfiguration event in step S1005 of FIG. 10. In FIG. 11, the determination of whether or not a reconfiguration event is required starts at step S1101 in which it is determined if a new device is discovered on network 10. If a device is newly discovered, flow passes to step S1105, but if a device is not newly discovered, flow passes to step S1102 in which it is determined whether or not a performance based trigger has occurred, based on the performance counters received by configurator module 59 and/or on the monitored demands for service functions of each multifunction network device. For example, if all monitored demands for a given multifunction network device are for printing only, and the performance counters indicate that there is HDD, RAM and CPU capacity which is not being used by the print engine function module, then a performance-based trigger is set by configurator module 59. In the alternative, configurator module 59 can set a performance-based trigger when the demands for a particular service function of a multifunction network device reach a predetermined threshold, or when the capacity of certain hardware resources, such as HDD, RAM and/or CPU, being utilized by a particular function module reaches a predetermined threshold. If a performance-based trigger is set, flow passes to step S1105; otherwise, flow passes to step S1103.

In step S1103, it is determined whether a scheduled trigger has occurred in accordance with one or more of the reconfiguration schedules in programmed device schedules 61. If so, flow passes to step S1105; otherwise, flow passes to step S1104 in which it is determined whether or not a reconfiguration request has been received from one of the multifunction network devices. If so flow passes to step S1105; otherwise flow passes to return in step S1111 without a reconfiguration event having been declared. In step S1105, it is determined whether or not the declared reconfiguration event requires the deletion of function modules from one or more of the multifunction network devices. For example, a reconfiguration event based on the new discovery of a multifunction network device on network 10 may require the download of function modules to the multifunction network device for out-of-the-box configuration, and therefore would not require the deletion of function modules. On the other hand, a reconfiguration event based on a performance-based trigger might typically require the deletion of all function modules except for a designated function module, such as the print engine function module.

If it is determined in step S1105 that the reconfiguration event requires the deletion of one or more function modules, then flow passes to step S1106 in which a reconfiguration command is set to a delete command which specifies particular function modules to delete, or which specifies to delete all function modules except for a designated function module. If the reconfiguration event does not require the deletion of a function module, flow passes to step S1107 in which it is determined whether the reconfiguration event requires only the reallocation of hardware resources of one or more multifunction network devices. For example, if there are demands for printing and faxing for a particular multifunction network device, but the demand for printing greatly outweighs the demand for demand for faxing, a reconfiguration command can be sent to the multifunction network device to reallocate its RAM and CPU capacity so that more of the capacity is used for printing instead of faxing. If the reconfiguration event requires only the reallocation of hardware resources of a multifunction network device, then flow passes to step S1108 in which the reconfiguration command is set to a reconfiguration command which specifies the particular hardware resources to be reallocated and the percent capacity of the hardware resources to be used for each function module.

If the reconfiguration event does not require only the reallocation of hardware resources, then flow passes to step S1109 in which it is determined if the reconfiguration event requires the download of function modules to one or more multifunction network devices, such as in the new discovery of a multifunction network device on network 10, or at the stop time of a reconfiguration schedule event. If download is required, flow passes to step S1110 in which a reconfiguration command is set to a download "addition" command which includes specified versions of function modules for each affected multifunction network device to download from a component repository module. As discussed above, configurator module 59 obtains the version information for a specific multifunction network device from the corresponding device profile in device profiles 60. If the reconfiguration event does not require the deletion of function modules, reallocation of resources, or download and addition of function modules, then the reconfiguration event is invalid and flow passes to return in step S1111.

Figure 12:
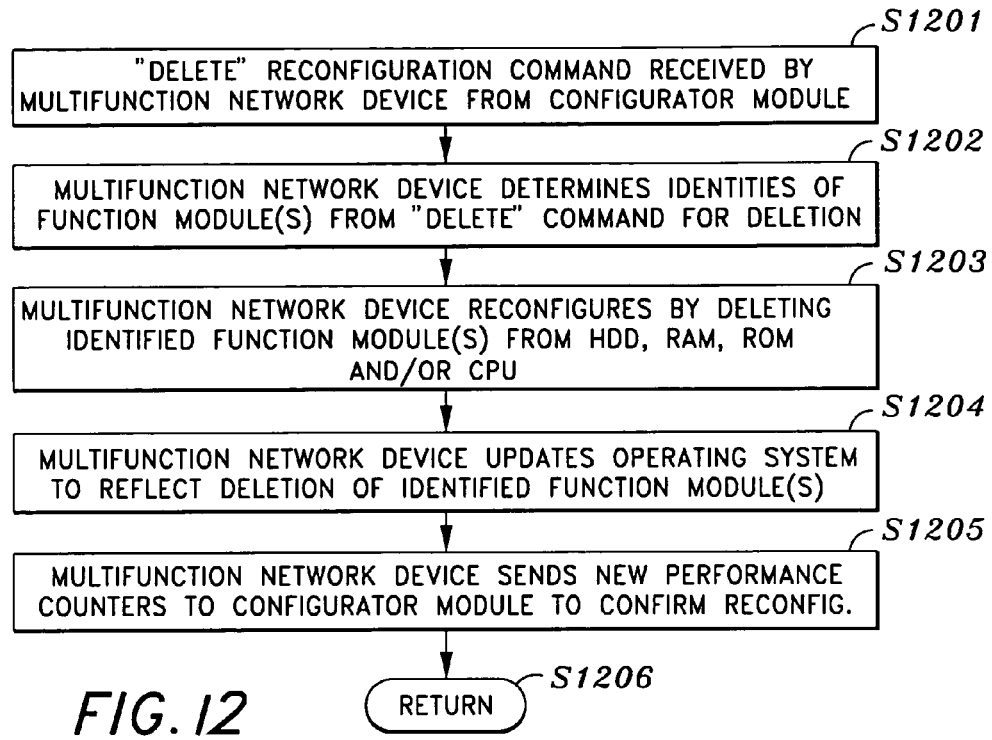
FIG. 12 is a flowchart for explaining the reconfiguration of a multifunction network device in response to a delete reconfiguration command according to one embodiment of the present invention.

FIG. 12 is a flowchart which depicts the response of a multifunction network device to receipt of a reconfiguration command from configurator module 59 which is comprised of a delete command. In step S1201, the delete reconfiguration command is received by the multifunction network device from configurator module 59. The multifunction network device then determines the identities of the function modules to be deleted from the reconfiguration command (step S1202). This determination is preferably based on the specific function module identities in the reconfiguration command, or based on an instruction in the reconfiguration command to delete all function modules except for a designated function module. The multifunction network device then reconfigures by deleting all of the identified function modules from its HDD, and by removing any portion of the identified function modules from its RAM, ROM and/or CPU (step S1203). In step S1204, the multifunction network device then updates its operating system to reflect the deletion of the identified functional modules so that the operating system no longer responds to demands for the services of the deleted function modules and so that resources are dedicated to the remaining function module(s). Lastly, the multifunction network device sends new performance counters to configurator module 59 which reflect that hardware resources are no longer being utilized by the deleted function modules, thereby confirming the reconfiguration of the multifunction network device (step S1205). Flow then passes to return in step S1206.

Figure 13:
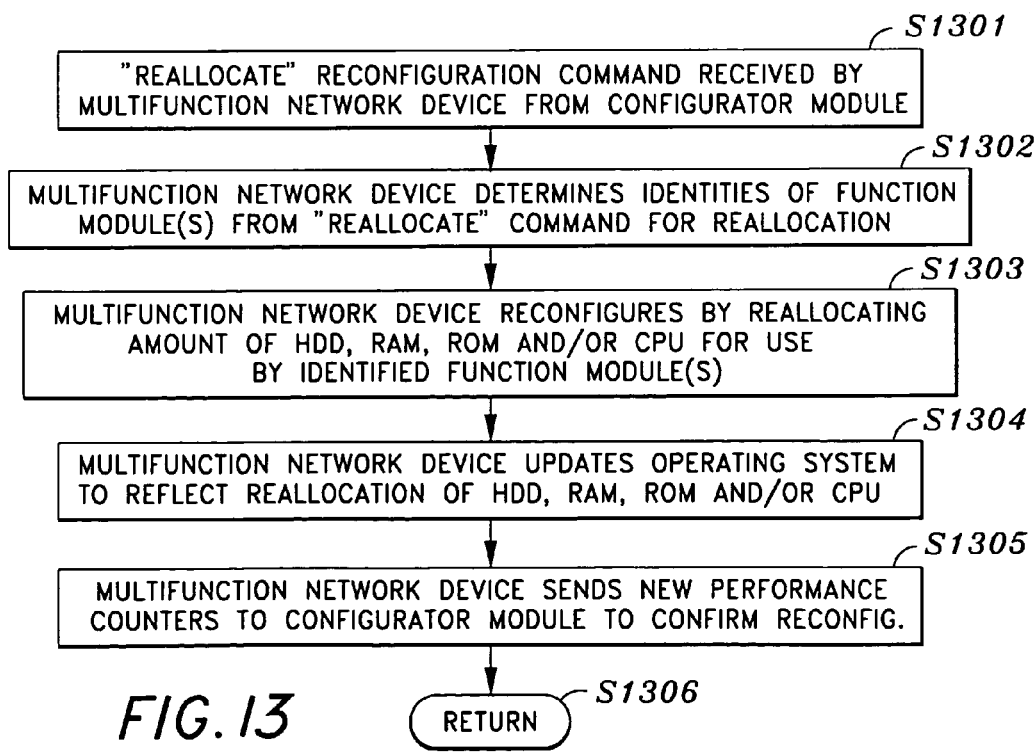
FIG. 13 is a flowchart for explaining the reconfiguration of a multifunction network device in response to a reallocate reconfiguration command according to one embodiment of the present invention.

FIG. 13 is a flowchart which depicts the response of a multifunction network device to receipt of a reconfiguration command from configurator module 59 which is comprised of a reallocation command. In step S1301, the reallocation reconfiguration command is received by the multifunction network device from configurator module 59. The multifunction network device then determines the identities of the function modules from the reconfiguration command for which the hardware resources are to be reallocated (step S1302). This determination is preferably based on the specific function module identities in the reallocation command, or based on an instruction in the reallocation command to reallocate the percentage of hardware resources dedicated to all function modules except for a designated function module. The multifunction network device then reconfigures by reallocating the amount of HDD, RAM, ROM and/or CPU dedicated for use by the identified function modules (step S1303). In step S1304, the multifunction network device then updates its operating system to reflect the reallocation of the hardware resources so that the operating system executes the function modules in accordance with the new allocation. Lastly, the multifunction network device sends new performance counters to configurator module 59 which reflect the reallocation of the hardware resources, thereby confirming the reconfiguration of the multifunction network device (step S1305). Flow then passes to return in step S1306.

Figure 14:
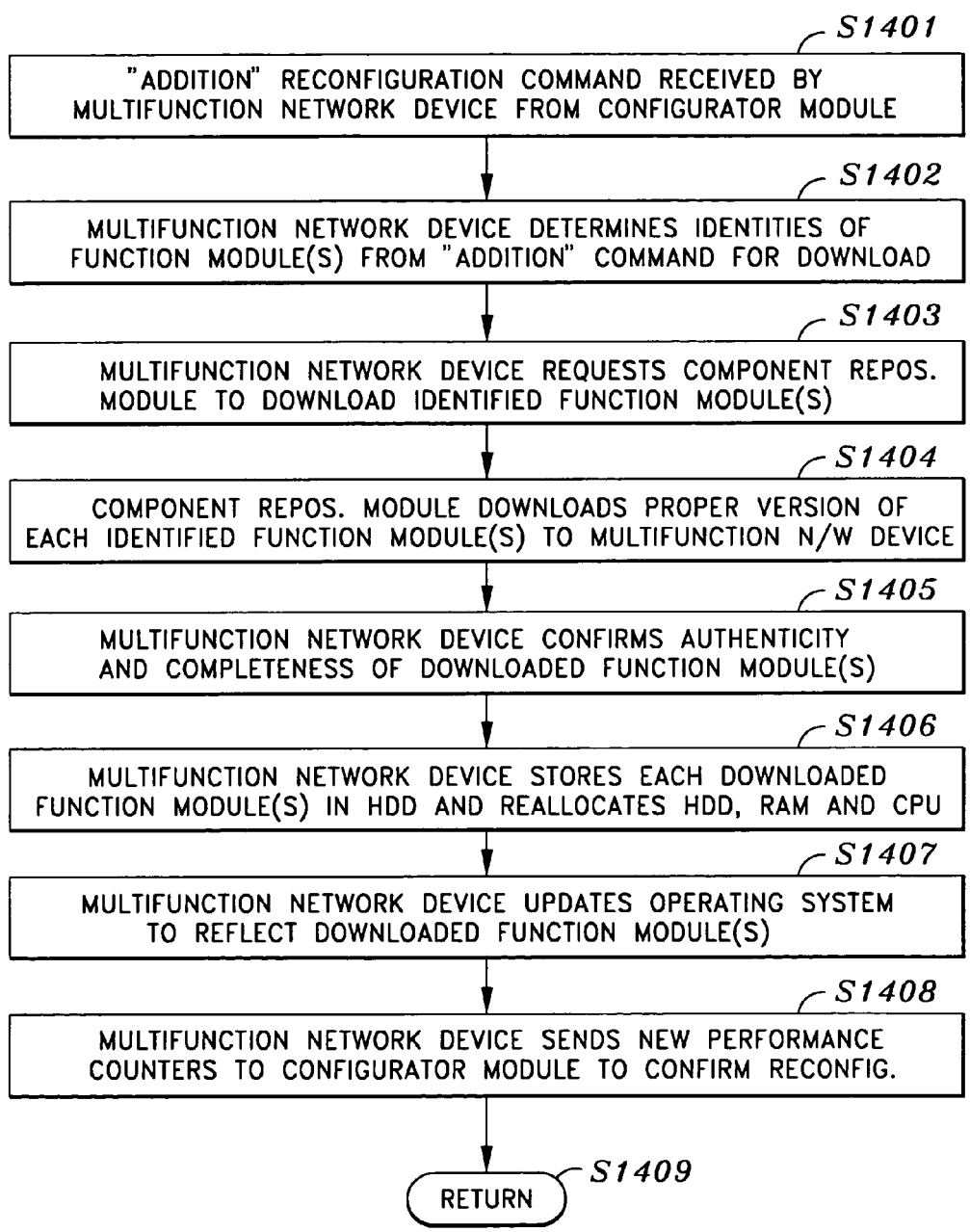
FIG. 14 is a flowchart for explaining the reconfiguration of a multifunction network device in response to an addition reconfiguration command according to one embodiment of the present invention.

FIG. 14 is a flowchart which depicts the response of a multifunction network device to receipt of a reconfiguration command from configurator module 59 which is comprised of an addition (download) command. In step S1401, the addition reconfiguration command is received by the multifunction network device from configurator module 59. The multifunction network device then determines the identities of the function module versions from the addition reconfiguration command which are to be downloaded (step S1402). As discussed above, configurator module 59 accesses and utilizes device profiles 60 to determine the specific function module versions to be downloaded for each of the corresponding multifunction network devices, and then includes the identifications of the function module versions in the reconfiguration command. Next, the multifunction network device sends a module request to a component repository module to download the specified function module versions (step S1403). The component repository module then accesses function modules to obtain the specified function module versions and then downloads them to the multifunction network device (step S1404). In step S1405, the multifunction network device confirms the authenticity and completeness of each downloaded function module version by using known techniques such as a checksum or digital signature.

The multifunction network device then stores the downloaded function modules in its HDD and reallocates the capacities of the RAM, ROM, and/or CPU which are dedicated to each function module (step S1406). In the alternative to storing on the HDD, one or more of the downloaded function modules can be stored in EEPROM of the multifunction network device by flash-burning the function modules into the EEPROM. The multifunction network device then updates its operating system to reflect the presence of the downloaded function modules and the reallocation of the hardware resources so that the operating system executes the function modules in accordance with the new allocation (step S1407). Lastly, the multifunction network device sends new performance counters to configurator module 59 which reflect the reallocation of the hardware resources, thereby confirming the download of the specified function modules and the reconfiguration of the multifunction network device (step S1408). Flow then passes to return in step S1409.

Figure 15:
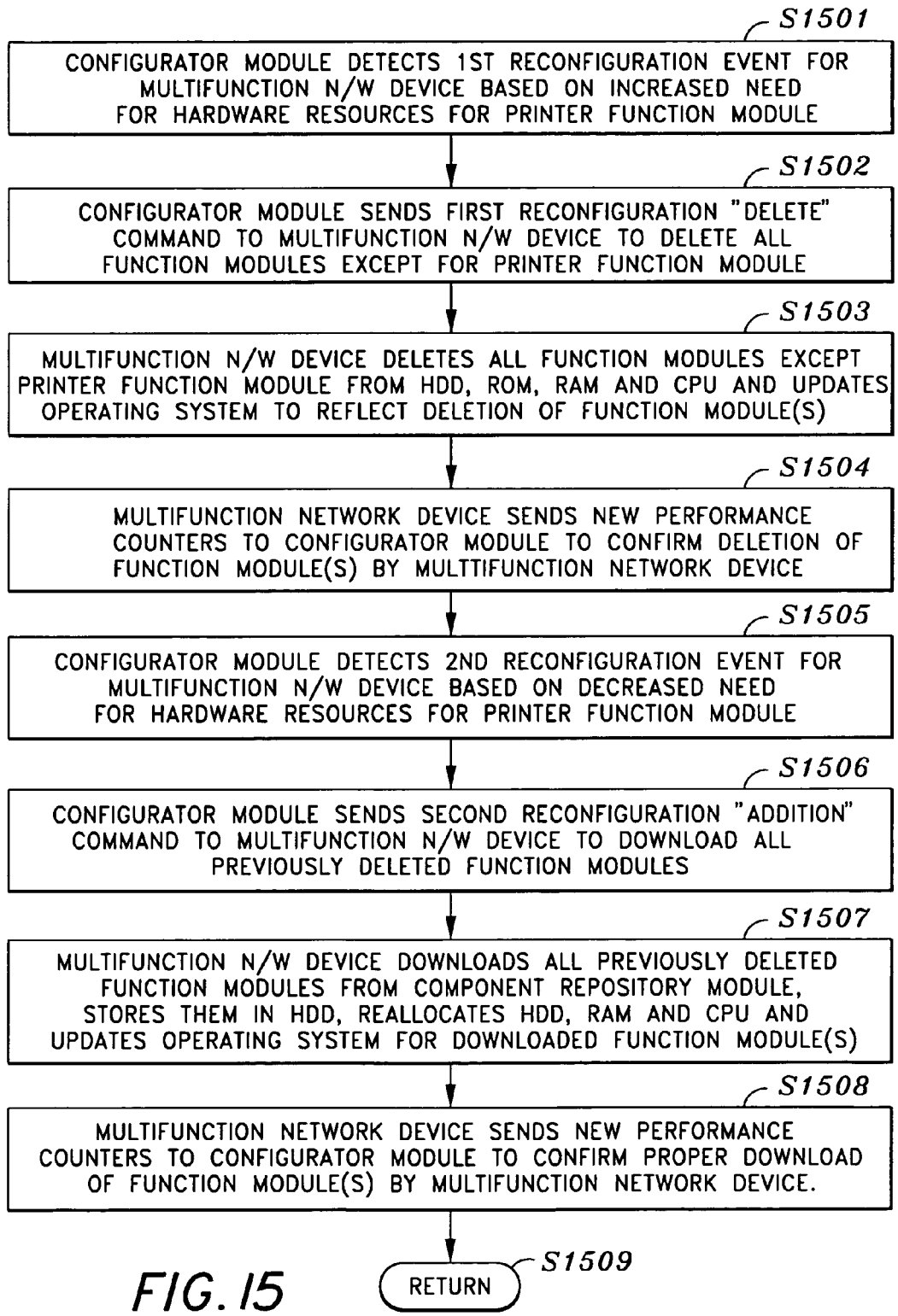
FIG. 15 is a flowchart for explaining one example of dynamic reconfiguration of a multifunction network device according to one embodiment of the present invention.

FIG. 15 is a flowchart which explains an example of dynamic reconfiguration of a multifunction network device according to the present invention. In step S1501, configurator module 59 detects a first reconfiguration event for a multifunction network device based on an increased need for hardware resources of the multifunction network device by the print engine function module. Next, configurator module 59 sends a first delete reconfiguration command to the multifunction network device to delete all function modules except for the print engine function module (step S1502). The multifunction network device then reconfigures by deleting all function modules except for the print engine function module from its HDD, RAM, ROM and CPU, reallocates the HDD, RAM and CPU for exclusive use by the print engine function module, and updates its operating system to reflect the deletion of the function modules and reallocation of hardware resources (step S1503). In step S1504, the multifunction network device sends new performance counters to configurator module 59 which confirm deletion of the function modules and reallocation of hardware resources.

In step S1505, configurator module 59 detects a second reconfiguration event for a multifunction network device based on a decreased need for hardware resources of the multifunction network device by the print engine function module. For example, when the number of print jobs being sent to the multifunction network device is greatly reduced. Next, configurator module 59 sends a second addition reconfiguration command to the multifunction network device to download all previously deleted function modules (step S1506). The multifunction network device then contacts a component repository module and requests download of all of the previously deleted function modules according to the identified function module versions in the addition reconfiguration command, upon which the component repository module downloads the identified function module versions to the multifunction network device, which then stores them on its HDD, reallocates the capacities of the HDD, RAM and CPU for use by all function modules, and updates its operating system to reflect the download and addition of the identified function modules and the reallocation of hardware resources (step S1507). In step S1508, the multifunction network device sends new performance counters to configurator module 59 which confirm the download and addition of the identified function modules and the reallocation of hardware resources. Flow then passes to return in step S1509.

Figure 16:
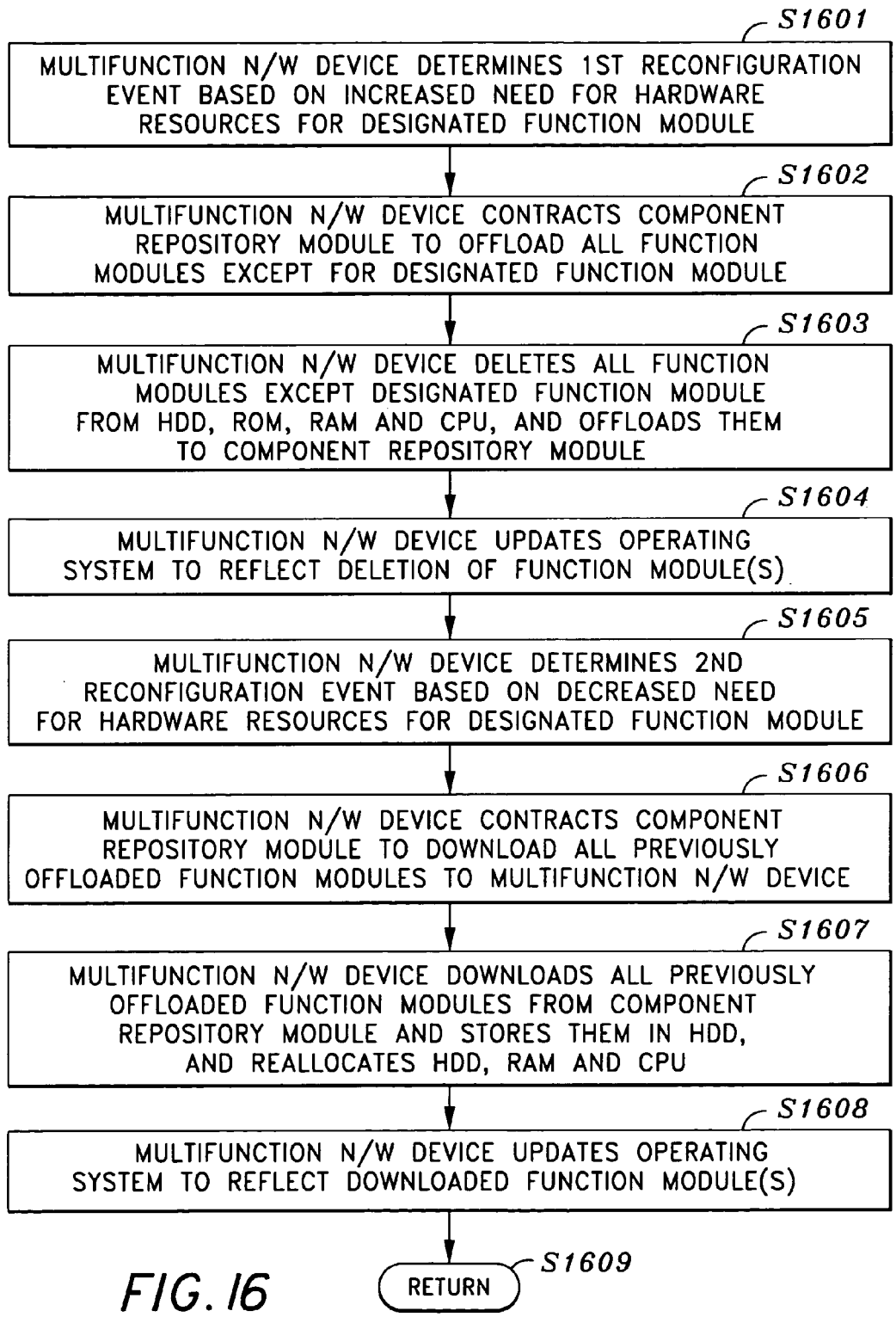
FIG. 16 is a flowchart for explaining a standalone dynamic reconfiguration of a multifunction network device according to another embodiment of the present invention.

FIG. 16 is a flowchart for explaining another aspect of the present invention in which a multifunction network device operates in a standalone reconfiguration mode. In this mode, the multifunction network device does not rely upon configurator module 59 to send the multifunction network device a reconfiguration command, but instead determines on its own to reconfigure and sends deleted function modules to a known site, such as a component repository module for later retrieval. Preferably, this logic is implemented in a configuration module of the multifunction network device, such as configuration module 35 of multifunction network device 15. In step S1601, configuration module 35 detects a first reconfiguration event for the multifunction network device based on an increased need for hardware resources of the multifunction network device by a designated function module, such as a print engine function module. Next, configuration module 35 contacts a component repository module requesting to offload all function modules except for the designated function module to the component repository module (step S1602). In step S1603, the multifunction network device then reconfigures by deleting all function modules except for the designated function module from its HDD, RAM, ROM and CPU, and offloads them to the component repository module for storage, and reallocates its HDD, RAM and CPU for exclusive use by the designated function module. The multifunction network device then updates its operating system to reflect the deletion of the function modules and reallocation of hardware resources (step S1604).

In step S1605, configuration module 35 detects a second reconfiguration event for the multifunction network device based on a decreased need for hardware resources of the multifunction network device by the designated function module. For example, when the number of print jobs being sent to the multifunction network device is greatly reduced. Next, configuration module 35 contacts the same component repository module to download all of the previously offloaded function modules to the multifunction network device (step S1606). The component repository module downloads the previously offloaded function modules to the multifunction network device based on identification information provided by the multifunction network device, and the multifunction network device then stores them on its HDD and reallocates the capacities of the HDD, RAM and CPU for use by all function modules (step S1607). In step S1608, the multifunction network device updates its operating system to reflect the download and addition of the previously offloaded function modules and the reallocation of hardware resources. In step S1609, flow passes to return.

Accordingly, the aspects of the present invention provide an efficient system to dynamically reconfigure one or more multifunction network devices based on demand for certain service functions of the device, and then to return the multifunction network device to its original combination of service function capabilities when the demand subsides.

The invention has been described with particular illustrative embodiments. It is to be understood that the invention is not limited to the above-described embodiments and that various changes and modifications may be made by those of ordinary skill in the art without departing from the spirit and scope of the invention. In particular, and as stated above, the invention can be used to manage various types of network devices, not just network printers.

What is claimed is:

1. A method for managing a plurality of multifunction network devices on a network, each multifunction network device having a network interface for communication on the network, each multifunction network device further having scanning and printing capabilities controlled by function modules, and each multifunction network device further having a plurality of hardware resources including a storage memory for storing a plurality of function modules which includes the function module for controlling the scanning capability and the function module for controlling the printing capability, a program memory for use by the function module for controlling the scanning capability and the function module for controlling the printing capability, and a processor for executing the function modules, said method comprising the steps of:

receiving a function module from an information processing apparatus;

confirming whether the received function module is or is not authenticated;

executing the plurality of function modules by the multifunction network devices using the hardware resources so as to control the scanning and printing capabilities;

detecting a reconfiguration event for one of the plurality of multifunction network devices, wherein the reconfiguration event is triggered by an increase or a decrease in demand for hardware resources of said one multifunction network device, and wherein the reconfiguration even indicates deletion of the function module for controlling the printing capability or the function module for controlling the scanning capability or indicates retrieval of the function module for controlling the printing capability or the function module for controlling the scanning capability;

sending a first reconfiguration command including a deletion command to delete the function module for controlling the printing capability or the function module for controlling the scanning capability from said one multifunction device, wherein the first reconfiguration command including the deletion command is sent over the network from an information processing apparatus on the network to said one multifunction network device corresponding to the reconfiguration event in case that the reconfiguration event detected in the detecting step indicates the deletion of the function module for controlling the printing capability or the function module for controlling the scanning capability in response to the increase of demand for the hardware resources; and sending a second reconfiguration command including a retrieval command to retrieve a deleted function module for controlling the printing capability or the deleted function module for controlling the scanning capability by sending the deleted function module from the information processing apparatus to said one multifunction network device via the network, wherein the second reconfiguration command including the retrieval command is sent over the network to said one multifunction network device corresponding to the reconfiguration event in case that the reconfiguration event detected in the detecting step indicates the retrieval of the function module for controlling the printing capability or the function module for controlling the scanning capability in response to the decrease of the demand for the hardware resources;

first reconfiguring said one multifunction network device by deleting the function module in said one multifunction network in accordance with the first reconfiguration command and sending the function module to the information processing apparatus via the network, wherein said one multifunction device operates itself without the scanning capability corresponding to the deleted function module for controlling the scanning capability or without the printing capability corresponding to the deleted function module for controlling the printing capability; and second reconfiguring said one multifunction network device by retrieving the deleted function module for controlling the scanning capability or the deleted function module for controlling the printing capability deleted in the first reconfiguring step from the information processing apparatus on the network in accordance with the second reconfiguration command, and executing the retrieved function module by said one multifunction network device so as to control a scanning or printing capability using the hardware resources, wherein said one multifunction device operates itself with scanning capability corresponding to the retrieved function module for controlling the scanning capability or with printing capability corresponding to the retrieved function module for controlling the printing capability.

2. A method according to claim 1, wherein the reconfiguration event is a request for execution of one of the plurality of function modules by the one multifunction network device.

3. A method according to claim 1, wherein the reconfiguration event is a trigger set by a configuration module executing in a computing device on the network.

4. A method according to claim 3, wherein the trigger is set in response to a detection by the configuration module of an increased demand for use of the storage memory and of the program memory in the one multifunction network device.

5. A method according to claim 4, wherein the detection by the configuration module of an increased demand for use of the storage memory and of the program memory is based on resource information data which is passed from the one multifunction network device to the configuration module.

6. A method according to claim 5, wherein the resource information data includes a current utilized amount of the storage memory and a current utilized amount of the program memory of the one multifunction network device.

7. A method according to claim 5, wherein the resource information data is passed in an SNMP message from the one multifunction network device to the configuration module.

8. A method according to claim 3, wherein the trigger is set by the configuration module based on receipt of a request message by the configuration module from the one multifunction network device.

9. A method according to claim 8, wherein the request message comprises a request by the one multifunction network device for an increased useable capacity of the storage memory and of the program memory in the one multifunction network device.

10. A method according to claim 8, wherein the request message is passed in an SNMP message from the one multifunction network device to the configuration module.

11. A method according to claim 3, wherein the configuration module monitors an overall demand for execution of each of the plurality of functions by the plurality of multifunction network devices, and wherein the trigger is set by the configuration module based on a detected increase in the overall demand for execution of one of the plurality of functions.

12. A method according to claim 11, wherein the configuration module monitors the overall demand for execution of each of the plurality of functions by monitoring a plurality of function request messages which are sent to the plurality of multifunction network devices.

13. A method according to claim 1, wherein the one multifunction network device is reconfigured in accordance with the reconfiguration command by deleting at least one of the function modules from the storage memory.

14. A method according to claim 1, wherein the one multifunction network device is reconfigured in accordance with the reconfiguration command by deleting all of the function modules except one designated function module from the storage memory.

15. A method according to claim 1, wherein the one multifunction network device is reconfigured in accordance with the reconfiguration command by reallocating a designated amount of the program memory for use by each of the function modules.

16. A method according to claim 1, wherein the one multifunction network device is reconfigured in accordance with the reconfiguration command by instructing an operating system in the one multifunction network device to respond only to a function request message which requests execution of a designated function module.

17. A method according to claim 1, wherein in the sending step the reconfiguration command can further be selected from an addition command to add a designated function module to the storage memory and the program memory of the one multifunction network device.

18. A method according to claim 17, wherein the reconfiguration event is a trigger set by a configuration module executing in a server on the network, and the trigger is based on a detection by the configuration module that the one multifunction device has a decreased demand for use of the storage memory and of the program memory.

19. A method according to claim 18, wherein the detection by the configuration module of an decreased demand for use of the storage memory and of the program memory is based on resource information data which is passed from the one multifunction network device to the configuration module.

20. A method according to claim 19, wherein the resource information data includes a current utilized amount of the storage memory and a current utilized amount of the program memory of the one multifunction network device.

21. A method according to claim 19, wherein the resource information data is passed in an SNMP message from the one multifunction network device to the configuration module.

22. A method according to claim 17, wherein the reconfiguration event is a trigger set by a configuration module executing in a server on the network, and the trigger is based on an expiration of a predetermined time duration which was initiated at a last reconfiguration event for the one multifunction device.

23. A method according to claim 17, wherein the reconfiguration event is a trigger set by a configuration module executing in a server on the network, and the trigger is based on receipt of a request message by the configuration module from the one multifunction network device.

24. A method according to claim 23, wherein the request message comprises a request by the one multifunction network device for the addition of at least one function module to the storage memory and to the program memory in the one multifunction network device.

25. A method according to claim 17, wherein the reconfiguration event is a trigger set by a configuration module executing in a server on the network, and the trigger is based on discovery by the configuration module of the one multifunction network device on the network.

26. A method according to claim 25, wherein the one multifunction network device is discovered by detection of an SNMP announcement message sent over the network by the one multifunction network device.

27. A method according to claim 17, wherein, in the case that the reconfiguration command is an addition command to add a designated function module to the storage memory and the program memory of the one multifunction network device, the designated function module is downloaded to the one multifunction network device.

28. A method according to claim 27, wherein the designated function module is downloaded to the one multifunction network device from a component repository module in response to an instruction from a configuration module.

29. A method according to claim 28, wherein the component repository module and the configuration module are executing on a same computing device on the network.

30. A method according to claim 28, wherein the component repository module and the configuration module are executing on a separate respective computing devices on the network.

31. A method according to claim 28, wherein the component repository module executes on a server on the network.

32. A method according to claim 28, wherein a version identification of the designated function module is provided in the instruction from the configuration module to the component repository module.

33. A method according to claim 32, wherein the version identification is determined in accordance with a preset profile corresponding to the one multifunction network device.

34. A method according to claim 33, wherein the preset profile corresponding to the one multifunction network device contains information regarding allowed function modules that can be downloaded to the one multifunction network device and a version identification for each of the allowed function modules.

35. A method according to claim 27, wherein the designated function module is downloaded to the one multifunction network device from a component repository module in response to an instruction from the one multifunction network device.

36. A method according to claim 35, wherein a version identification of the designated function module is provided in the instruction from the one multifunction network device to the component repository module.

37. A method according to claim 1, wherein the reconfiguration event is a trigger set by the one multifunction network device based on a determination by the one multifunction network device that there is a need for an increased useable capacity of the storage memory and of the program memory in the one multifunction network device.

38. A method according to claim 37, wherein the reconfiguration command is sent internally within the one multifunction network device which is reconfigured in accordance with the reconfiguration command by deleting all of the function modules except one designated function module from the storage memory and from the program memory.

39. A method according to claim 38, wherein the deleted function modules are sent from the one multifunction network device to a component repository on the network, and wherein the deleted modules are subsequently retrieved by the one multifunction network device from the component repository and added to the storage memory and to the program memory.

40. A method according to claim 1, wherein the one multifunction network device is reconfigured in accordance with the reconfiguration command by prohibiting the use of program memory for at least one of the function modules.

41. A method according to claim 1, wherein the one multifunction network device is reconfigured in accordance with the reconfiguration command by prohibiting the use of program memory for all of the function modules except a designated function module.

42. A method performed in an information processing apparatus which includes a network interface for connection to a network, wherein the information processing apparatus includes a storage unit for storing a plurality of function modules and is constructed to communicate over the network interface with a plurality of multifunction network devices on the network, wherein each multifunction network device has function modules which include a function module for controlling a scanning capability and a function module for controlling a printing capability of the multifunction network device, as well as hardware resources used by the function modules to perform the scanning and printing capabilities, said method comprising the steps of:

detecting a reconfiguration event from at least one of the plurality of multifunction network devices, wherein the reconfiguration event is triggered by an increase or a decrease in demand for hardware resources of said one multifunction network device, and wherein the reconfiguration event indicates deletion of the function module for controlling the printing capability or the function module for controlling the scanning capability or indicates retrieval of the function module for controlling the printing capability or the function module for controlling the scanning capability;

first sending a deletion command over the network to said one multifunction network device corresponding to the reconfiguration event, wherein the deletion command instructs deletion of the function module for controlling the scanning capability or the function module for controlling the printing capability, in case that the reconfiguration event detected by the detecting step is the event indicating a need to delete the function module for controlling the printing capability or the function module for controlling the scanning capability in said one multifunction network device in response to the increase of demand for the hardware resources, wherein said one multifunction network device operates itself without a scanning capability corresponding to the deleted function module for controlling the scanning capability or without a printing capability corresponding to the deleted function module for controlling the printing capability; and second sending a requested function module stored in the storage unit over the network to said one multifunction network device corresponding to the reconfiguration event, wherein the requested function module is the function module for controlling the printing capability or the function module for controlling the scanning capability, in case that the reconfiguration event detected by the detecting step is the event indicating a request for the deleted function module for controlling the printing capability or the deleted function module for controlling the scanning capability in response to the decrease of demand for the hardware resources, followed by an execution of the retrieved function module by said one multifunction network device so as to control a scanning or printing capability using the hardware resources, wherein prior to execution of the retrieved function module, said one multifunction network device confirms whether the retrieved function module is or is not authenticated; and wherein said one multifunction network device operates itself with a scanning capability corresponding to the retrieved function module for controlling the scanning capability or with a printing capability corresponding to the retrieved function module for controlling the printing capability.

43. A method for controlling a multifunction network device, wherein the multifunction network device includes a network interface for communication on the network, said multifunction network device further having function modules for controlling scanning and printing capabilities of said multifunction network device, wherein said function modules include a function module for controlling the scanning capability and a function module for controlling the printing capability, and said multifunction network device further having a plurality of hardware resources including a storage memory for storing a plurality of function modules which includes the function module for controlling the scanning capability and the function module for controlling the printing capability, a program memory to be used by the function modules, and a processor for executing the function modules, said method comprising the steps of:

executing the plurality of function modules by the multifunction network device using the hardware resources so as to control the scanning and printing capabilities;

determining whether the hardware resources need to be reallocated based on a status of use of the hardware resources by the plurality of function modules;

first reconfiguring by deleting the function module for controlling the scanning capability or the function module for controlling the printing capability from said multifunction network device and sending the deleted function module via the network interface over the network so as to secure the hardware resources in said multifunction network device, wherein the deleted function module is sent over the network to an information processing apparatus on the network, responsive to a case when the determining step determines that the hardware resources need to be reallocated, wherein said multifunction network device operates itself without a scanning capability corresponding to the deleted function module for controlling the scanning capability or without a printing capability corresponding to the deleted function module for controlling the printing capability; and second reconfiguring said multifunction network device by retrieving the deleted function module for the scanning capability or the deleted function module for the printing capability from the information processing apparatus over the network via the network interface in response to a status of use of the hardware resources after the first reconfiguring step, and executing the retrieved function module by said multifunction network device so as to control a scanning or printing capability using the hardware resources, wherein prior to execution of the retrieved function module, said multifunction network device confirms whether the retrieved function module is or is not authenticated, and wherein said multifunction network device operates itself with a scanning capability corresponding to the retrieved function module for controlling the scanning capability or with a printing capability corresponding to the retrieved function module for controlling the printing capability.

44. An information processing apparatus comprising:

a network interface for connection to a network for communicating over the network with a plurality of multifunction network devices, wherein each multifunction network device has function modules for controlling scanning and printing capabilities of the multifunction network device as well as hardware resources used by the function modules to perform the scanning and printing capabilities, wherein said function modules include a function module for controlling the scanning capability and a function module for controlling the printing capability;

a storage unit for storing a plurality of function modules;

a detector which detects a reconfiguration event from at least one of the plurality of multifunction network devices based on a status of use of hardware resources in said one multifunction network device, wherein the reconfiguration event is triggered by an increase or a decrease in demand for hardware resources of said one multifunction network device;

means for sending a deletion command over the network via the network interface for instructing the deletion of the function module for controlling the scanning capability or the function module for controlling the printing capability to said one multifunction network device corresponding to the reconfiguration event, in case that the detected reconfiguration event is the event indicating a need to delete the function module for controlling the scanning capability or the function module for controlling the printing capability in said one multifunction network device in response to the increase of demand for the hardware resources, wherein said one multifunction network device operates itself without a scanning capability corresponding to the deleted function module for controlling the scanning capability or without a printing capability corresponding to the deleted function module for controlling the printing capability; and means for sending a requested function module stored in the storage unit over the network via the network interface to said one multifunction network device corresponding to the reconfiguration event, in case that the detected reconfiguration event is the event indicating a request for retrieval of the function module for controlling the scanning capability or the function module for controlling the printing capability in response to the decrease of demand for the hardware resources, followed by execution of the retrieved function module by said one multifunction network device so as to control a scanning or printing capability using the hardware resources, wherein prior to execution of the retrieved function module, said one multifunction network device confirms whether the retrieved function module is or is not authenticated, and wherein said one multifunction network device operates itself with a scanning capability corresponding to the retrieved function module for controlling the scanning capability or with a printing capability corresponding to the retrieved function module for controlling the printing capability.

45. An apparatus for controlling a multifunction network device, wherein the multifunction network device includes a network interface for communication on the network, said multifunction network device further having function modules for controlling scanning and printing capabilities of said multifunction network device, wherein said function modules include a function module for controlling the scanning capability and a function module for controlling the printing capability, and said multifunction network device further having a plurality of hardware resources including a storage memory for storing a plurality of function modules which includes the function module for controlling the scanning capability and the function module for controlling the printing capability, a program memory to be used by the function modules, and a processor for executing the function modules using the hardware resources so as to control the scanning and printing capabilities, said apparatus comprising:

means for determining whether the hardware resources need to be reallocated based on a status of use of the hardware resources by the plurality of function modules;

means for deleting the function module for controlling the scanning capability or the function module for controlling the printing capability, and for sending the deleted function module over the network via the network interface so as to secure the hardware resources in said multifunction network device, wherein the deleted function module is sent over the network to an information processing apparatus on the network, responsive to a case when the means for determining determines that the hardware resources need to be reallocated, wherein said multifunction network device operates itself without a scanning capability corresponding to the deleted function module for controlling the scanning capability or without a printing capability corresponding to the deleted function module for controlling the printing capability;

means for reconfiguring the multifunction network device by retrieving the deleted function module for the scanning capability or the deleted function module for the printing capability from the information processing apparatus over the network via the network interface in response to a status of use of the hardware resources, and for executing the retrieved function module by said multifunction network device so as to control a scanning or printing capability using the hardware resources; and a processor constructed to implement functionality of said means for determining, said means for deleting, and said means for reconfiguring;

wherein prior to execution of the retrieved function module, said multifunction network device confirms whether the retrieved function module is or is not authenticated, and wherein said multifunction network device operates itself with a scanning capability corresponding to the retrieved function module for controlling the scanning capability or with a printing capability corresponding to the retrieved function module for controlling the printing capability.

46. A computer-readable memory medium having computer-executable process steps stored thereon for controlling an information processing apparatus which includes a network interface for connection to a network, wherein the information processing apparatus includes a storage unit for storing a plurality of function modules and is constructed to communicate over the network interface with a plurality of multifunction network devices on the network, wherein each multifunction network device has function modules which include a function module for controlling a scanning capability and a function module for controlling a printing capability of the multifunction network device, as well as hardware resources used by the function modules to perform the scanning and printing capabilities, wherein said process steps comprise:

a detecting step to detect a reconfiguration event from at least one of the plurality of multifunction network devices, wherein the reconfiguration event is triggered by an increase or a decrease in demand for hardware resources of said one multifunction network device, and wherein the reconfiguration event indicates deletion of the function module for controlling the printing capability or the function module for controlling the scanning capability or indicates retrieval of the function module for controlling the printing capability or the function module for controlling the scanning capability;

a first sending step to send a deletion command over the network to said one multifunction network device corresponding to the reconfiguration event, wherein the deletion command instructs deletion of the function module for controlling the scanning capability or the function module for controlling the printing capability, in case that the reconfiguration event detected by the detecting step is the event indicating a need to delete the function module for controlling the printing capability or the function module for controlling the scanning capability in said one multifunction network device in response to the increase of demand for the hardware resources, wherein said one multifunction network device operates itself without a scanning capability corresponding to the deleted function module for controlling the scanning capability or without a printing capability corresponding to the deleted function module for controlling the printing capability; and a second sending step to send a requested function module stored in the storage unit over the network to said one multifunction network device corresponding to the reconfiguration event, wherein the requested function module is the function module for controlling the printing capability or the function module for controlling the scanning capability, in case that the reconfiguration event detected by the detecting step is the event indicating a request for the deleted function module for controlling the printing capability or the deleted function module for controlling the scanning capability in response to the decrease of demand for the hardware resources, followed by an execution of the retrieved function module by said one multifunction network device so as to control a scanning or printing capability using the hardware resources, wherein prior to execution of the retrieved function module, said one multifunction network device confirms whether the retrieved function module is or is not authenticated, and wherein said one multifunction network device operates itself with a scanning capability corresponding to the retrieved function module for controlling the scanning capability or with a printing capability corresponding to the retrieved function module for controlling the printing capability.

47. A computer-readable memory medium having computer-executable process steps stored thereon for controlling a multifunction network device, wherein the multifunction network device includes a network interface for communication on the network, and wherein the multifunction network device has function modules for controlling scanning and printing capabilities of said multifunction network device, wherein said function modules include a function module for controlling the scanning capability and a function module for controlling the printing capability, and further has a plurality of hardware resources including a storage memory for storing a plurality of function modules which includes the function module for controlling the scanning capability and the function module for controlling the printing capability, a program memory to be used by the function modules, and a processor for executing the function modules, wherein said process steps comprise:

an executing step to execute the plurality of function modules by the multi function network device using the hardware resources so as to control the scanning and printing capabilities;

a determining step to determine whether the hardware resources need to be reallocated based on a status of use of the hardware resources by the plurality of function modules;

a first reconfiguring step to reconfigure by deleting the function module for controlling the scanning capability or the function module for controlling the printing capability from said multifunction network device and sending the deleted function module over the network via the network interface so as to secure the hardware resources in said multifunction network device, wherein the deleted function module is sent over the network to an information processing apparatus on the network, responsive to a case when the determining step determines that the hardware resources need to be reallocated, wherein said multifunction network device operates itself without a scanning capability corresponding to the deleted function module for controlling the scanning capability or without a printing capability corresponding to the deleted function module for controlling the printing capability; and a second reconfiguring step to reconfigure said multifunction network device by retrieving the deleted function module for the scanning capability or the deleted function module for the printing capability from the information processing apparatus over the network via the network interface in response to a status of use of the hardware resources after the first reconfiguring step, and to execute the retrieved function module by said multifunction network device so as to control a scanning or printing capability using the hardware resources, wherein prior to execution of the retrieved function module, said multifunction network device confirms whether the retrieved function module is or is not authenticated, and wherein said multifunction network device operates itself with a scanning capability corresponding to the retrieved function module for controlling the scanning capability or with a printing capability corresponding to the retrieved function module for controlling the printing capability.

48. An information processing apparatus comprising:

a network interface for connection to a network and for communication with a plurality of multifunction network devices on the network, wherein each multifunction network device has function modules which include a function module for controlling a scanning capability and a function module for controlling a printing capability of the multifunction network device, as well as hardware resources used by the function modules to perform the scanning and printing capabilities;

a storage unit for storing a plurality of function modules and for storing computer-executable process steps; and a processor for executing the computer-executable process steps stored in said storage unit;

wherein said process steps comprise:

a detecting step to detect a reconfiguration event from at least one of the plurality of multifunction network devices, wherein the reconfiguration event is triggered by an increase or a decrease in demand for hardware resources of said one multifunction network device, and wherein the reconfiguration event indicates deletion of the function module for controlling the printing capability or the function module for controlling the scanning capability or indicates retrieval of the function module for controlling the printing capability or the function module for controlling the scanning capability;

a first sending step to send a deletion command over the network to said one multifunction network device corresponding to the reconfiguration event, wherein the deletion command instructs deletion of the function module for controlling the scanning capability or the function module for controlling the printing capability, in case that the reconfiguration event detected by the detecting step is the event indicating a need to delete the function module for controlling the printing capability or the function module for controlling the scanning capability in said one multifunction network device in response to the increase of demand for the hardware resources, wherein said one multifunction network device operates itself without a scanning capability corresponding to the deleted function module for controlling the scanning capability or without a printing capability corresponding to the deleted function module for controlling the printing capability; and a second sending step to send a requested function module stored in the storage unit over the network to said one multifunction network device corresponding to the reconfiguration event, wherein the requested function module is the function module for controlling the printing capability or the function module for controlling the scanning capability, in case that the reconfiguration event detected by the detecting step is the event indicating a request for the deleted function module for controlling the printing capability or the deleted function module for controlling the scanning capability in response to the decrease of demand for the hardware resources, followed by an execution of the retrieved function module by said one multifunction network device so as to control a scanning or printing capability using the hardware resources, wherein prior to execution of the retrieved function module, said one multifunction network device confirms whether the retrieved function module is or is not authenticated, and wherein said one multifunction network device operates itself with a scanning capability corresponding to the retrieved function module for controlling the scanning capability or with a printing capability corresponding to the retrieved function module for controlling the printing capability.

49. A multifunction network device comprising:

a network interface for communication on the network; and a plurality of hardware resources including a storage memory for storing a plurality of function modules which includes a function module for controlling a scanning capability of the multifunction network device and a function module for controlling a printing capability of the multifunction network device, a program memory to be used by the function modules, and a processor for executing the function modules, wherein said program memory stores computer-executable process steps executable by the processor, and wherein said process steps comprise:

an executing step to execute the plurality of function modules by the multifunction network device using the hardware resources so as to control the scanning and printing capabilities;

a determining step to determine whether the hardware resources need to be reallocated based on a status of use of the hardware resources by the plurality of function modules;

a first reconfiguring step to reconfigure by deleting the function module for controlling the scanning capability or the function module for controlling the printing capability from said multifunction network device and sending the deleted function module over the network via the network interface so as to secure the hardware resources in said multifunction network device, wherein the deleted function module is sent over the network to an information processing apparatus on the network, responsive to a case when the determining step determines that the hardware resources need to be reallocated, wherein said multifunction network device operates itself without a scanning capability corresponding to the deleted function module for controlling the scanning capability or without a printing capability corresponding to the deleted function module for controlling the printing capability; and a second reconfiguring step to reconfigure said multifunction network device by retrieving the deleted function module for the scanning capability or the deleted function module for the printing capability from the information processing apparatus over the network via the network interface in response to a status of use of the hardware resources after the first reconfiguring step, and to execute the retrieved function module by said multifunction network device so as to control a scanning or printing capability using the hardware resources, wherein prior to execution of the retrieved function module, said multifunction network device confirms whether the retrieved function module is or is not authenticated, and wherein said multifunction network device operates itself with a scanning capability corresponding to the retrieved function module for controlling the scanning capability or with a printing capability corresponding to the retrieved function module for controlling the printing capability.

* * * * *